July 18, 1944.　　　　　F. X. REES　　　　　2,353,930
CODED TRACK CIRCUIT SIGNALING SYSTEM
Filed Aug. 3, 1942　　　14 Sheets-Sheet 1

INVENTOR
F. X. Rees,
BY Neil A. Preston,
his ATTORNEY

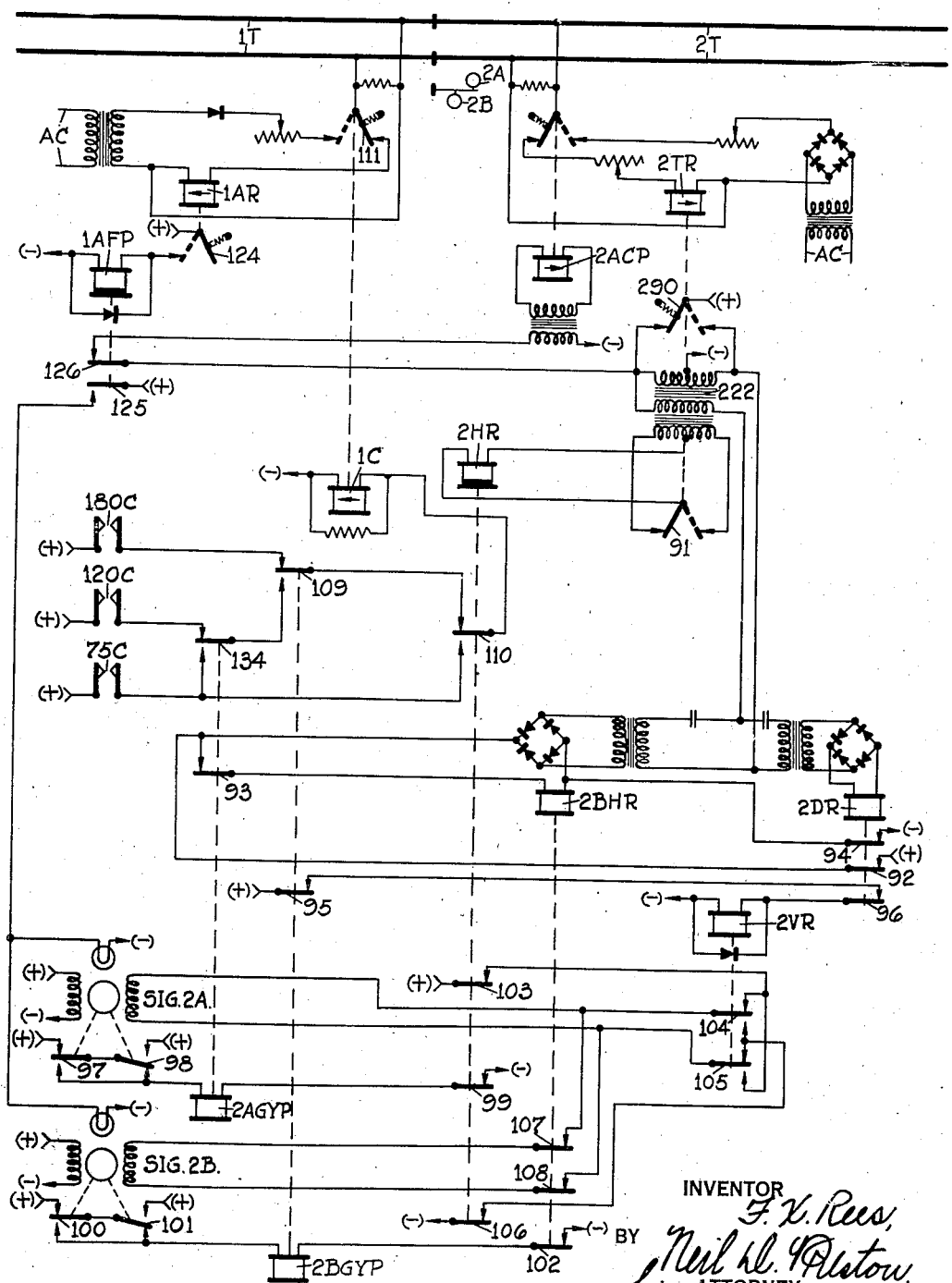

July 18, 1944.   F. X. REES   2,353,930
CODED TRACK CIRCUIT SIGNALING SYSTEM
Filed Aug. 3, 1942   14 Sheets-Sheet 3

INVENTOR
F. X. Rees,
BY Neil W. Preston,
his ATTORNEY

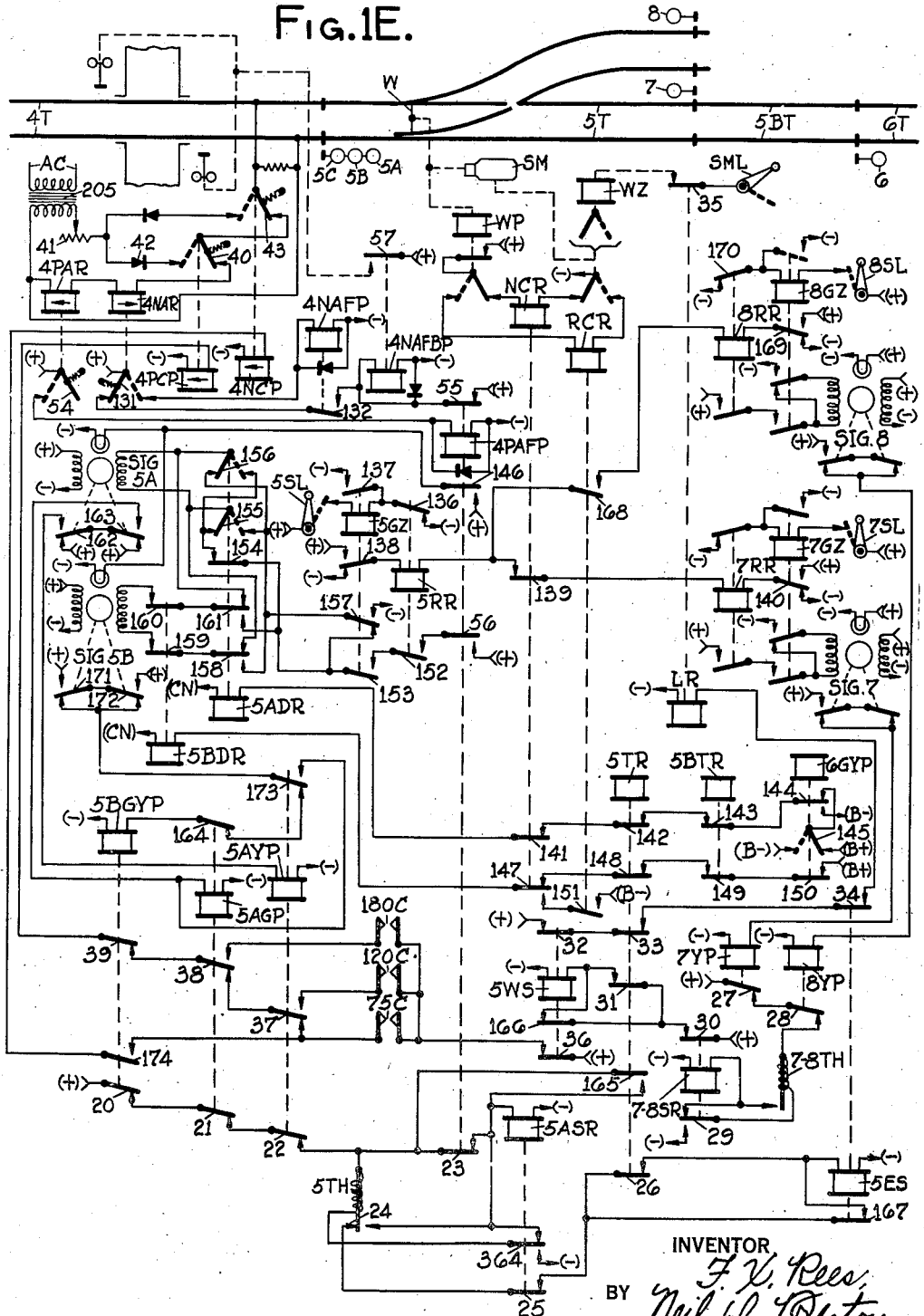

July 18, 1944.   F. X. REES   2,353,930
CODED TRACK CIRCUIT SIGNALING SYSTEM
Filed Aug. 3, 1942   14 Sheets-Sheet 6
Fig. 2A.
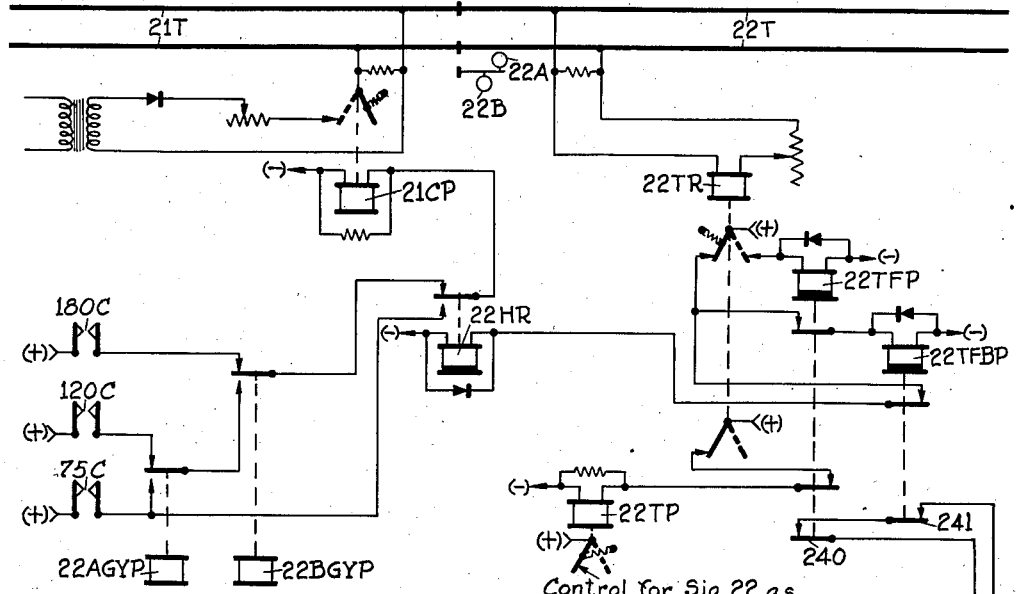
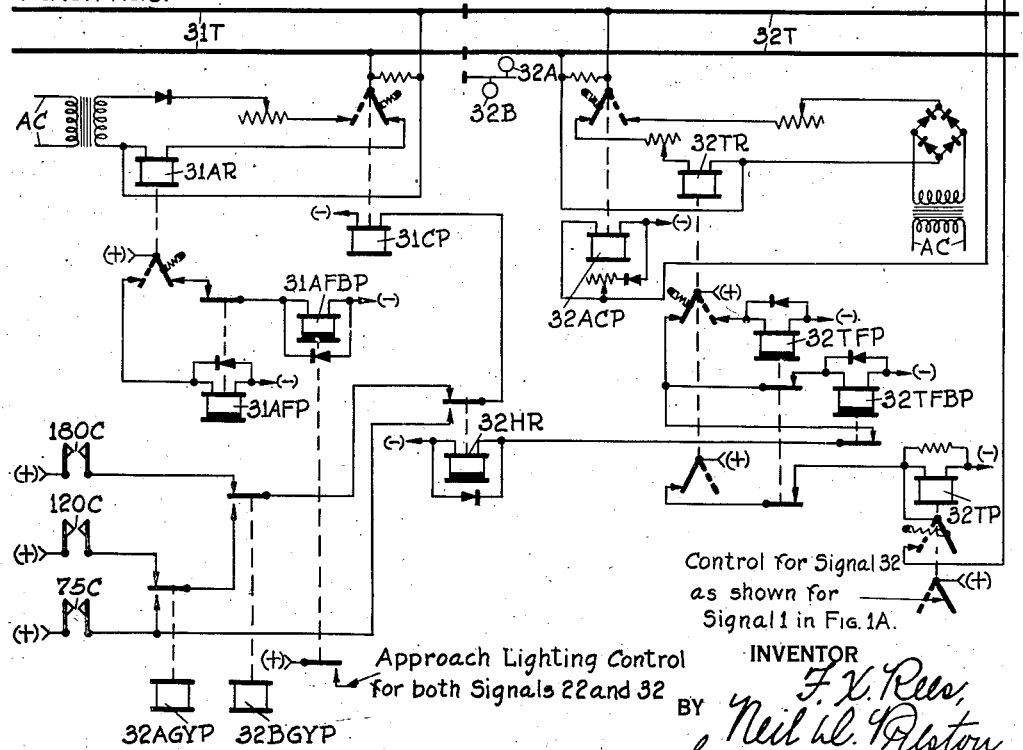
INVENTOR
F. X. Rees,
BY Neil W. Preston,
his ATTORNEY

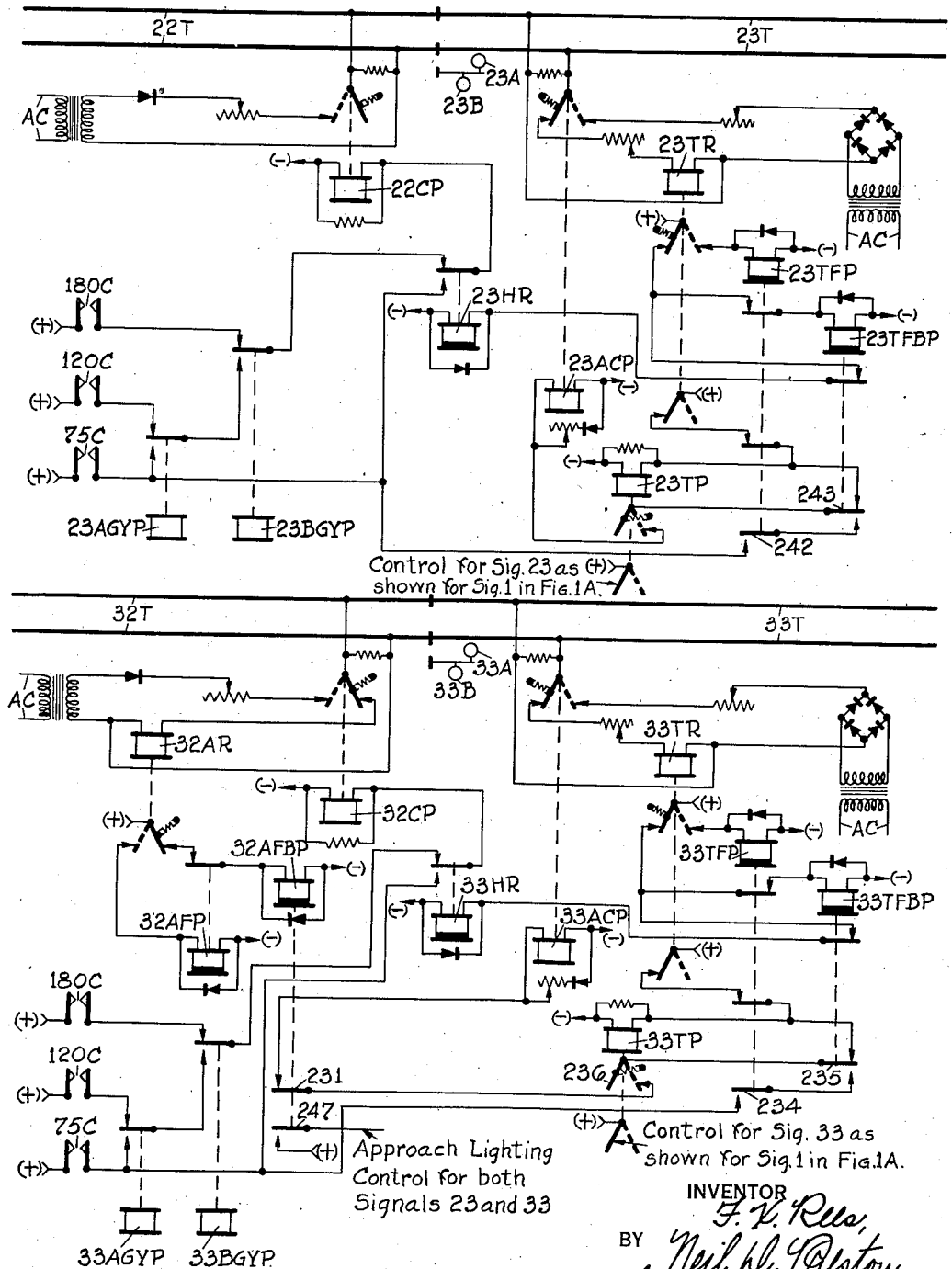

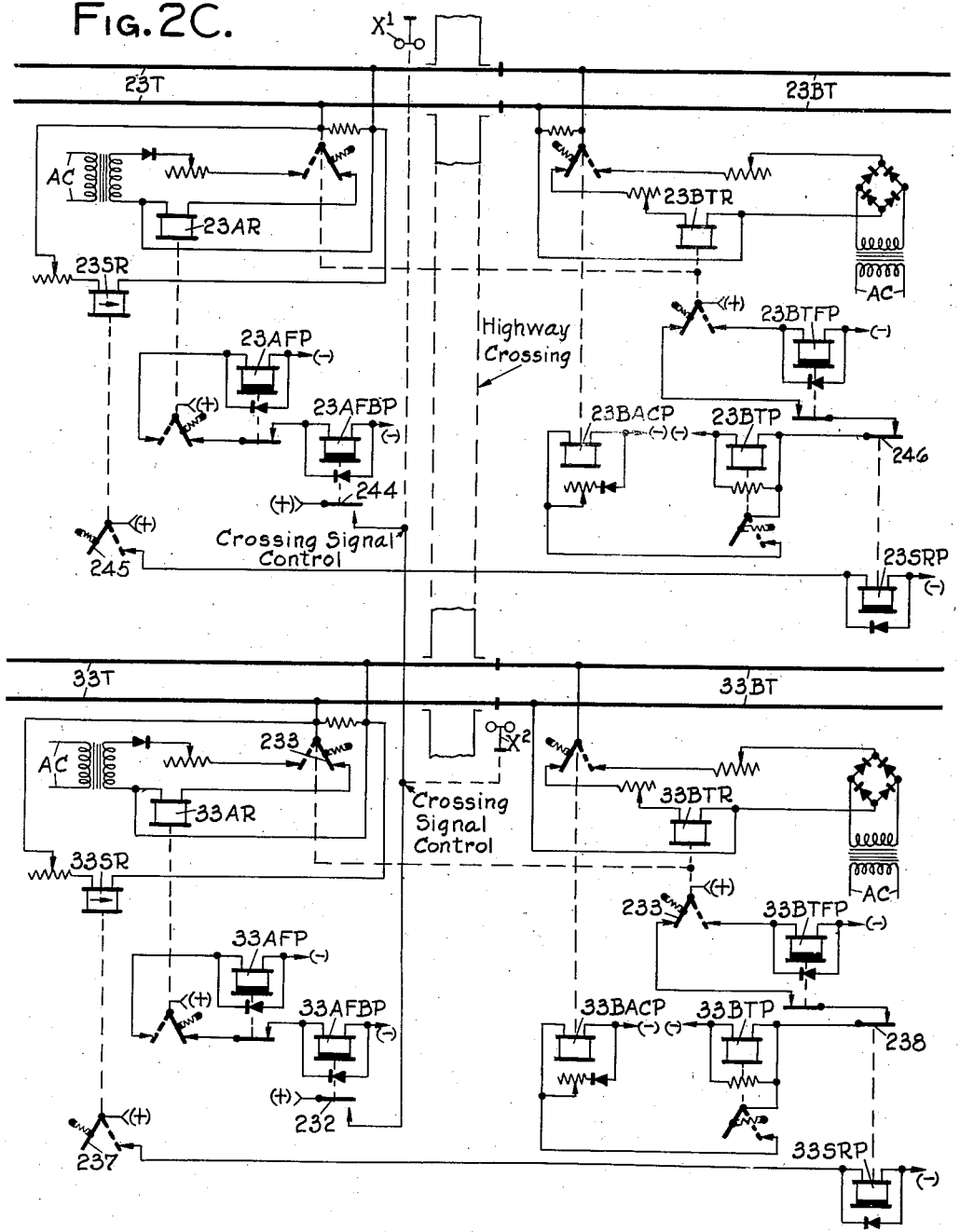

July 18, 1944.   F. X. REES   2,353,930
CODED TRACK CIRCUIT SIGNALING SYSTEM
Filed Aug. 3, 1942   14 Sheets-Sheet 9

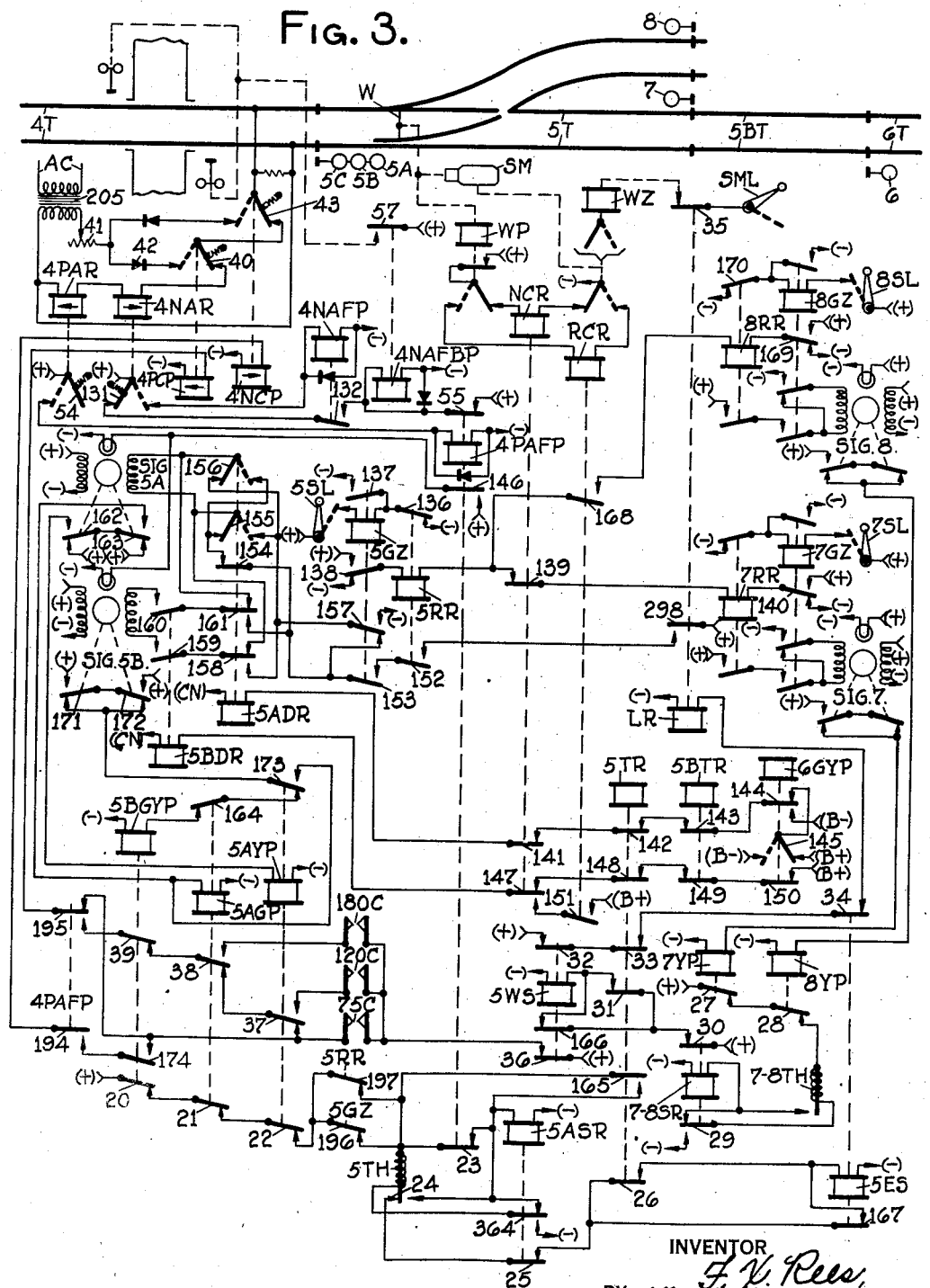

July 18, 1944.  F. X. REES  2,353,930
CODED TRACK CIRCUIT SIGNALING SYSTEM
Filed Aug. 3, 1942  14 Sheets-Sheet 12

INVENTOR
Frank X. Rees
BY Neil W. Preston
his ATTORNEY

July 18, 1944.  F. X. REES  2,353,930
CODED TRACK CIRCUIT SIGNALING SYSTEM
Filed Aug. 3, 1942  14 Sheets-Sheet 13

INVENTOR
F. X. Rees
BY Neil L. Preston
his ATTORNEY

July 18, 1944.   F. X. REES   2,353,930
CODED TRACK CIRCUIT SIGNALING SYSTEM
Filed Aug. 3, 1942   14 Sheets-Sheet 14

INVENTOR
F. X. Rees
BY Neil W. Preston
his ATTORNEY

UNITED STATES PATENT OFFICE 2,353,930

CODED TRACK CIRCUIT SIGNALING SYSTEM

Frank X. Rees, Rochester, N. Y., assignor to General Railway Signal Company, Rochester, N. Y.

Application August 3, 1942, Serial No. 453,313

25 Claims. (Cl. 246—38)

The present invention relates to automatic signaling systems for railroads, and more particularly to the application of coded track circuit apparatus to the control of wayside signals both in automatic territory and in territory approaching interlocking plants with the system so organized as to provide for the control of highway crossing signals located within such territory.

In the usual coded track circuit, driven codes are transmitted over the rails of each section by applying impulses of current at selected rates at one end of that track circuit section with suitable means at the other end of such section for distinctively responding to the different driven codes. These driven code impulses are, of course, spaced with intervals of deenergization which are conveniently termed the "off" periods of a driven code. At the receiving end of each track section, many coded track circuit systems provide for the transmission of inverse codes, that is, means is provided for applying impulses to the rails of the track section during the "off" periods of a driven code, and these impulses are received at the opposite end of the track section. The apparatus for applying these inverse codes is controlled by the reception of the driven codes in such a way that the inverse code impulses are synchronized with the driven code impulses and thus have the same rate. Such an organization of driven and inverse codes provides that different signal controls may be transmitted through a track section or block in accordance with traffic conditions by using distinctive code rates, while approach control may be effected in the opposite direction by suitably governing the inverse codes.

One feature of the present invention is to provide the current energy for the driven codes from an alternating current source through a half-wave rectifier. The track circuit is then organized with bleeder and variable resistances selected in accordance with the characteristics of the track relays and the track circuit in such a way as to provide that the average track relay current is substantially constant in spite of variations in the track section ballast resistance. A further advantage of this organization is the improved shunting characteristics due to the peak voltages of the half-waves of current which act to break down the contact resistance between the train wheels and the rails, although the average current flow is maintained within the operating range of the track relay. This type of track circuit is particularly useful in a coded circuit signaling system because the coded currents may be employed to control cab signals on the trains as well as wayside signals without the usual necessity of providing alternating current for the cab signals superimposed on direct current for controlling the wayside signals.

Another feature of the present invention is to provide approach route locking control for a power operated track switch (or switches) by the use of inverse codes in the approach zone in the rear of a home signal with such approach control so organized as to have its reliability checked. This is accomplished by requiring the presence of a train in the approach zone and the consequent response of the approach control means before allowing a change in the code rates to be transmitted in accordance with the clear indication of a home signal, thereby insuring that the approach control over the track switches in advance of the home signal has been effective to govern the approach locking before a distant approach signal may give a less restrictive indication.

The present invention proposes to employ not only distinctive driven code rates for characteristically governing signal indications, but also under certain conditions to use different polarities for the same code rates. In similar manner, different polarities are also proposed to be applied to inverse codes in certain sections for giving distinctive controls. It is, therefore, proposed, as another object of the invention, to provide broken down joint protection between the various track circuits or track sections regardless of whether polarities are used to give distinctive controls or whether the adjoining track circuits are of the conventional coded type.

The present invention further proposes the use of coded track circuit signaling in such a way that two tracks having traffic in the same direction may have their signals approach lighted by the control of the inverse code on only one of the tracks, to thereby eliminate the necessity for the inverse code apparatus for one of the two tracks. This is particularly advantageous where traffic travels in the same direction on two adjoining tracks, inasmuch as the signals for both tracks must be illuminated with a train on either track so that an engineer may readily identify the signal indications intended to govern his track.

A still further feature of the invention is to provide a coded track circuit signaling system which is adapted for providing the necessary highway crossing signal control regardless of whether the highway is located near the entering end of a track section or near the exit end of the track section.

Other objects, purposes and characteristic features of the present invention will be in part obvious from the accompanying drawings and in part pointed out as the description of the invention progresses.

In describing the invention in detail, reference will be made to the accompanying drawings, in which corresponding reference characters are used to designate corresponding parts throughout the various figures, and in which like letter reference characters are used to designate devices having similar features and functions, such letter reference characters being generally made distinctive by reason of preceding numerals indicative of the particular locations or functions with which their devices are associated, and in which:

Figs. 1A to 1E inclusive illustrate diagrammatically the general organization of the embodiment of the invention as provided in approach to an interlocking plant;

Figs. 2A to 2D inclusive illustrate diagrammatically the embodiment of the present invention as applied to two adjoining tracks signaled for traffic in the same direction on both tracks;

Fig. 3 illustrates a modified form of the circuits associated with the home signal of the interlocking plant to provide the same check on the approach control as shown in Figs. 1A to 1E but with a different sequence of operation to permit the home signal to clear regardless of the presence of a train in the approach zone;

Fig. 4 diagrammatically illustrates the circuit arrangements of a simplified cab signal equipment adapted for use on a train in connection with the coded track circuit signaling system disclosed herein;

Figs. 5A to 5J, letter I omitted, are diagrams of the different typical conditions of operation of the system disclosed in Figs. 1A to 1E inclusive;

Figure 1A:
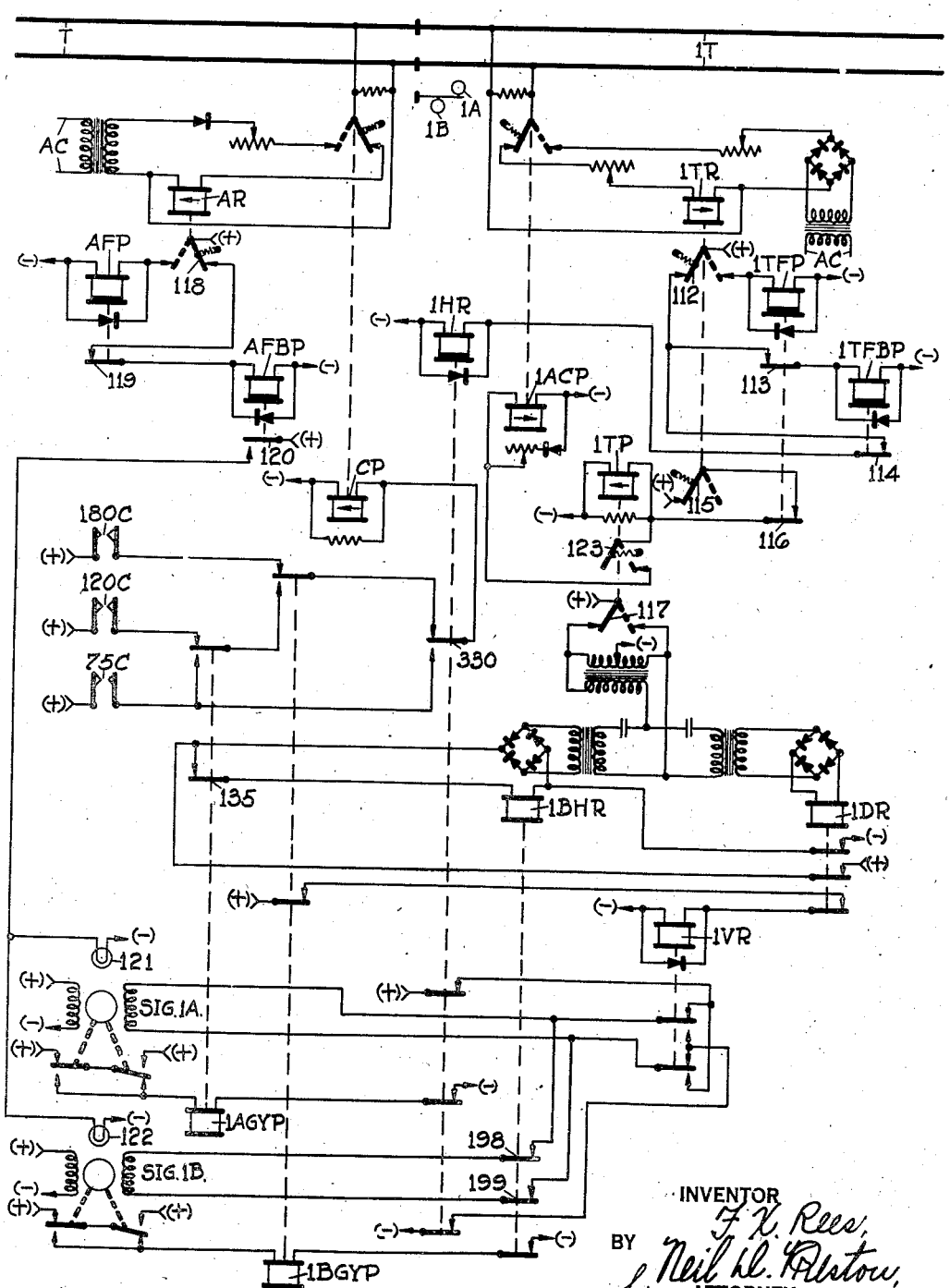

For the purpose of simplifying the illustration of this embodiment of the present invention and facilitating in the explanation thereof, various parts and circuits have been shown diagrammatically rather than showing the specific constructions and arrangements of parts that would be employed in practice. The various relays and their contacts are illustrated in a conventional manner and symbols are used to indicate their connections to the terminals of batteries or other sources of electric current instead of showing all of the wiring connections to the terminals. For convenience in the disclosure, certain of the relay contacts have been shown in a conventional written circuit manner, such contacts being identified as associated with particular relays because of the reference characters of such relays respectively appearing above those contacts.

The symbols (+) and (—) are employed to indicate the positive and negative terminals respectively of suitable batteries or other sources of direct current, and the circuits with which these symbols are used always have current flowing in the same direction. If alternating current is to be used, the symbols (+) and (—) are to be considered as instantaneous relative polarities. In connection with some circuits, the symbols (B+) and (B—) indicate connections to the opposite terminals of a suitable battery, or other direct current source which has a central or intermediate tap designated (CN); and the circuits with which these symbols are used may be current flowing in one direction or the other dependent upon the particular terminal used in combination with the intermediate tap (CN).

In describing the present invention, reference will be made from time to time to functions common to all parts of a similar character by use of letter reference characters common to such parts without the preceding numerals characteristic of the location or devices with which the respective parts are associated.

DESCRIPTION OF TRACK LAYOUT AND APPARATUS

With reference to Figs. 1A, 1B, 1C, 1D and 1E, placed side by side in that order, it will be seen that a stretch of track having track sections or track circuits T, 1T, 2T, 3T, 4T, 5T, 5BT and 6T is provided with automatic signals for governing traffic in one direction in approach to a home signal which governs traffic over a track switch W. These automatic signals are numbered 1 to 4 inclusive with the letters A and B to distinguish between the upper and lower arms of these signals, which upper and lower arms are offset to indicate that they are of the permissive or stop and proceed type of automatic signal.

The home signal 5 has upper and lower arms A and B and a call-on signal 5C, all of which are in alignment to indicate that this signal is a stop and stay signal under manual control of an operator. Associated with the track switch W are two dwarf signals 7 and 8 for governing switching movements in an opposite direction over the switch W.

All of these signals have been shown to be of the search-light type, such as shown in the Patent No. 1,835,150, dated December 8, 1931 to O. S. Field, although it should be understood that position light signals, color light signals or semaphore signals can readily be employed in place of those illustrated. Each of the search-light signals when deenergized, displays a red indication for danger or stop, and when energized with a particular polarity provides a yellow indication for caution, and when energized with the opposite polarity provides a green indication for clear. These three indications of the respective search-light units are used in combination on the upper and lower arms of these signals to give a larger number of signal aspects than can be displayed by a single search-light unit. The following table gives the signal aspects and their definitions:

CHART OF SIGNAL INDICATIONS OR ASPECTS

| Automatic block signal indications | Interlocking or home signal indications |
|---|---|
| G}<br>G} =Proceed | G}<br>G} =Proceed<br>R} |
| Y}<br>Y} =Proceed preparing to stop at second signal. | Y}<br>Y} =Proceed preparing to stop at second signal.<br>R} |
| Y}<br>R} =Proceed preparing to stop at next signal. Reduce to medium speed. | Y}<br>R} =Proceed preparing to stop at next signal. Reduce to medium speed.<br>R} |
| Y}<br>G} =Approach next signal at medium speed. | R}<br>Y} =Proceed at medium speed preparing to stop at next signal. Used for diverging medium speed route.<br>R} |
| G}<br>Y} =Approach second signal at medium speed. | R}<br>R} =Proceed at restricted speed.<br>Y} |
| R}<br>R} =Stop, then proceed at restricted speed. | R}<br>R} =Stop and stay.<br>R} |

In the above table, the letter G is used for a green indication; the letter Y for a yellow indication; and the letter R for a red indication. The letters are placed one above the other for any one aspect to illustrate the indications given by the upper and lower arms of the signals.

The letters placed one above the other for any one aspect are used more particularly in the drawings to indicate the positions to which the signal mechanisms are actuated (see Figs. 5A-5J), it being understood that the signals are actually illuminated, or caused to display their indications, only when a train is approaching such signals under conditions explained hereinafter. For the purpose of the specification, words are used as well as letters to express the various aspects of the signals. For example, a signal which is indicating yellow over red may be expressed in either of two ways, namely, Y/R, or yellow/red.

For the above definitions, it may also be understood that a medium speed is not to exceed 30 miles per hour; that a slow speed is not to exceed 15 miles per hour; and that a restricted speed is such as not to exceed that speed which will enable a train to stop short of a train ahead, or other obstruction within sighting distance, and not exceeding slow speed.

The track switch W is located in advance of the home signal 5, and is considered to be typical of any number of track switches included in an associated interlocking plant. This typical track switch is power operated by a suitable switch machine SM which can be, for example, of the type disclosed in the patent to W. K. Howe, Patent No. 1,466,903, dated September 4, 1923. Suitable remote switch control apparatus such as shown, for example, in the patent to Hoppe et al., Patent No. 1,877,876, dated September 20, 1932, is employed with such a switch machine to provide overload protection and the like. The switch machine SM is controlled by a switch control relay WZ from a remote point in accordance with the normal or reverse position of a switch control lever SML. This remote control may be of any suitable type such as shown, for example, in the prior patent to Hoppe et al., above mentioned.

A neutral polar relay WP (see Fig. 1E) is associated with the track switch W in the usual manner for repeating the correspondence between the switch points and the switch operating mechanism. This relay WP is normally energized with one polarity or the other in accordance with the normal or reverse position of the track switch W and in accordance with its locked condition. The relay WP is deenergized whenever the switch machine becomes unlocked or the switch points are out of correspondence with the switch machine. Associated with this relay WP are two correspondence relays NCR and RCR for respectively indicating the normal or reverse correspondence between the relay WP and the remotely controlled relay WZ.

The interlocking signals 5, 7 and 8 are shown as respectively controlled by suitable signal levers 5SL, 7SL and 8SL which are interrelated by a suitable interlocking network including a relay GZ for each signal lever and a route relay RR for the ends of each of the routes. The relays 5GZ and 5RR in conjunction with distant relays 2ADR and 2BDR control the signals 5A and 5B subject to certain checking features provided in accordance with the present invention which will be described hereinafter. The relays 8GZ and 8RR control the signal 8; and the relays 7GZ and 7RR control the signal 7.

A dwarf signal 6 has been indicated in advance of signal 5 assuming that it governs traffic over other track switches.

Each of these signals 5, 6, 7 and 8 are provided with repeater relays for repeating the positions of their respective signals. For example, the signal 5A has associated therewith a relay 5AGP for repeating the green position of such signal; and repeating relay 5AYP for repeating the yellow position of such signal. The signal 5B has a single relay 5BGYP for repeating both the green and yellow positions of that signal.

Suitable locking is provided for the switch machine SM by a lock relay LR which is controlled by directional stick relays 5WS and 5ES which in turn are controlled by the route locking relays have associated therewith thermal relays 7—8TH and 5TH for measuring the release period of the route locking under certain circumstances.

At the interlocking plant, it is assumed that the track sections 5T, 5BT and 6T, for example, are of the usual directed current normally energized type, and having respectively associated therewith track relays 5TR, 5BTR and 6TR (not shown).

The other track circuits or sections are of the coded track circuit type having apparatus and circuit organizations in accordance with the present invention. Each such track circuit has a code transmitting relay CP at one end which transmits codes in accordance with traffic conditions, which codes have their impulses time spaced at different rates in accordance with suitable oscillator contacts indicated in the drawings by 180C, 120C, and 75C (see Fig. 1B). These oscillator contacts produce codes of the 180, 120 and 75 code rates although it should be understood that other suitable rates might just as well be selected. These transmitter relays CP are of the two-position biased polar type relays as indicated in the drawings and respond quickly to energization and deenergization of their windings. However, each one of these transmitter relays is provided with a suitable shunting resistance which is regulated to give exactly the timing operation required of these relays. The pulsing operation of a transmitter relay CP applies energy from a suitable alternating current source from a step-down transformer as indicated in the drawings through a single half-wave rectifier and variable resistance so that each code impulse applied to the track rails comprises a series of half-wave of alternating current.

Figure 1C:
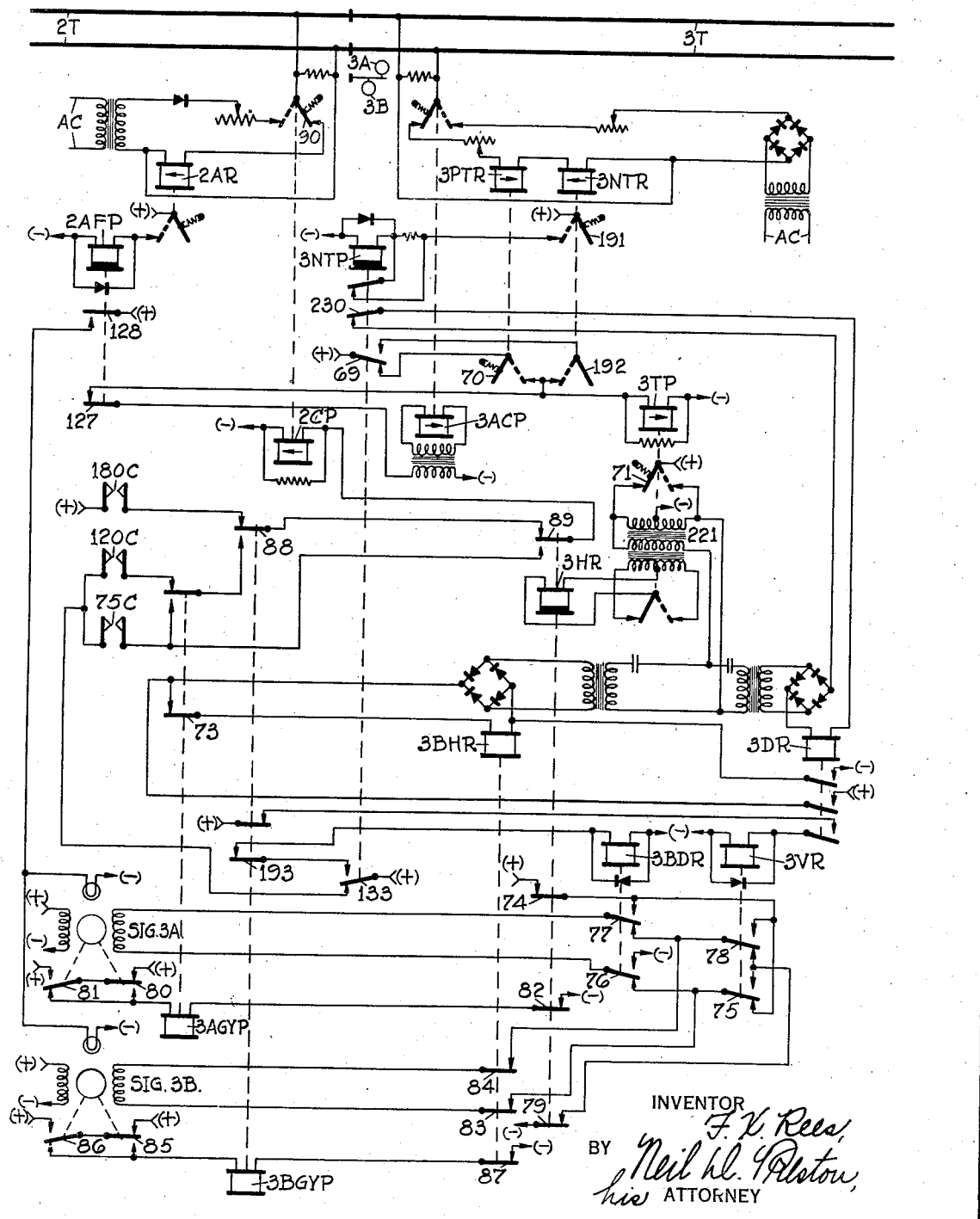
Figure 1D:
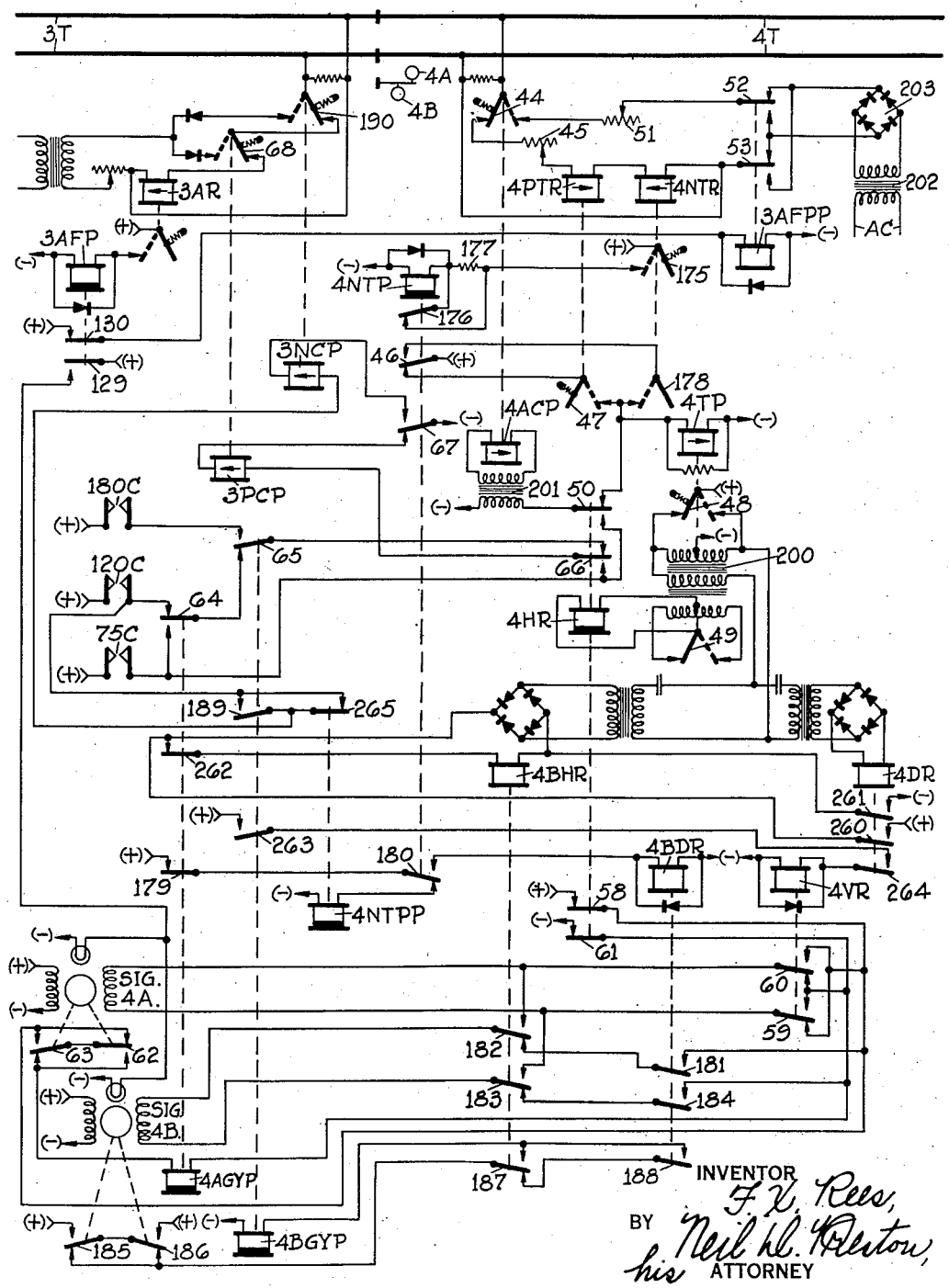
Figure 2D:
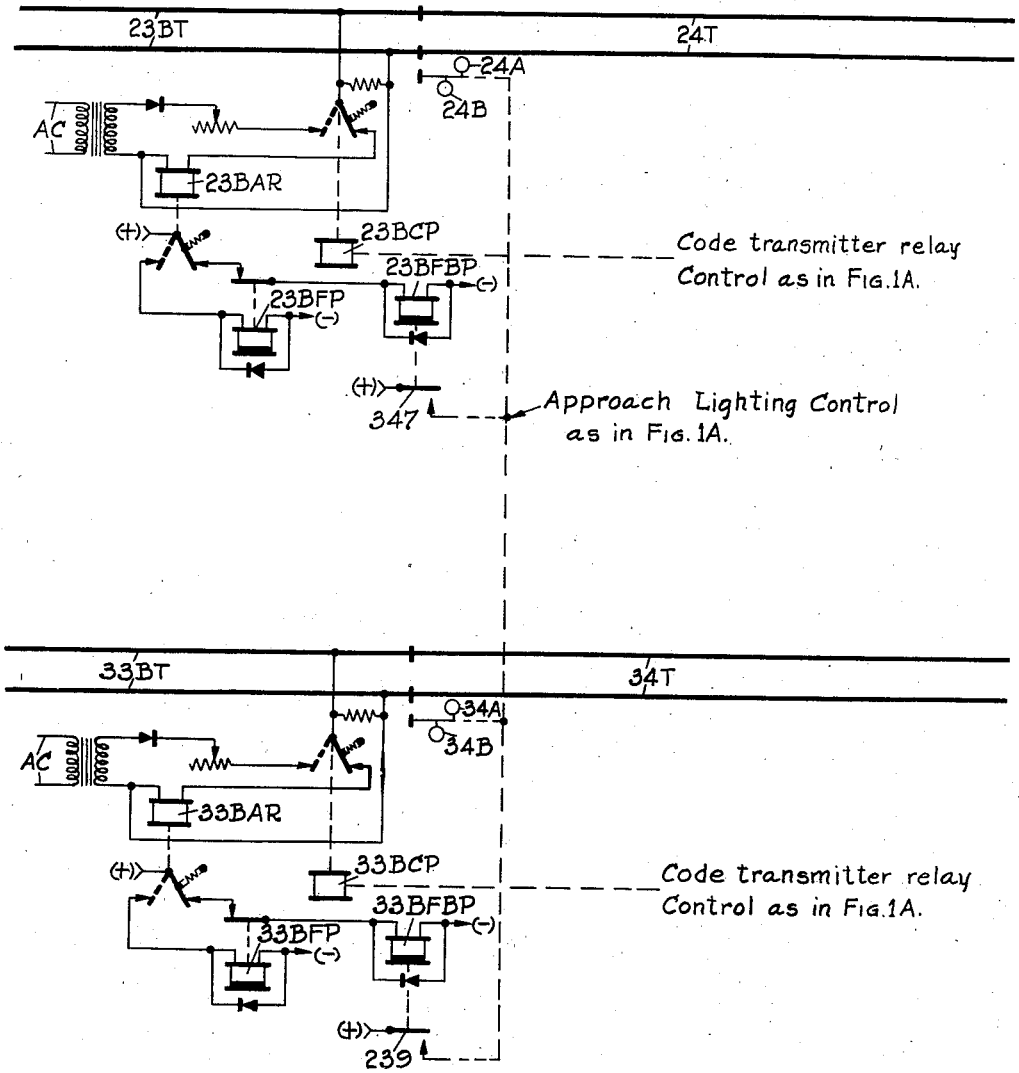

At the opposite end of each track circuit is a suitable track relay TR also of the two-position biased polar type which is normally connected across the track rails (see Fig. 1A). This track relay TR acts upon suitable decoding apparatus including a transformer, resonated circuits, a relay BHR responsive to the 120 code rate and a relay DR responsive to the 180 code rate. These relays are controlled so as to be picked up only by their respective code rates. However, associated with each track relay is a slow acting home relay HR which is responsive to the 75 code rate and to either of the other two code rates 120 and 180. In Figs. 1B, 1C and 1D, this home relay HR is controlled through one winding of the decoding transformer and a rectifier contact on the track relay, but in Fig. 1A the home relay is shown as a slow-acting relay controlled through front and back track repeating relays TFP and TFBP. Certain of the track relays TR have associated therewith track repeating relays TP.

For the transmission of inverse or approach control codes, a transmitting relay ACP is associated with the track relay end of each of the track sections. This approach control transmitting relay is also of the two-positon biased polar type of relay and is inductively controlled as shown in Fig. 1B, for example, but may be controlled by suitable circuits as shown in Fig. 1A.

At the driven code transmitting end of each track circuit is a suitable approach relay AR which is responsive to inverse codes. This relay AR is supplied with an approach front repeating relay AFP and an approach front-back repeating relay AFBP. In certain instances, the front-back repeating relay AFBP is omitted. Also, associated with the control of the signals at each signal location is a relay VR which is provided to cause certain sequences of operation between the signals when they change from one indication to another. The automatic signals are also provided with yellow-green repeating relays GYP.

In Fig. 1E, a highway crossing is shown closely adjacent to the home signal 5, and is provided with suitable flashing light signals which have been indicated as controlled upon the deenergization of a relay 4NAFBP. The control for such crossing signals has not been shown in detail as it is well understood by those skilled in the art, but has been merely indicated so that the time at which these crossing signals are set into operation may be easily understood.

In Figs. 1D and 1E where polarized driven codes are employed, a positive track relay 4PTR and a negative track relay 4TR are provided instead of a single track relay TR so as to be respectively responsive to positive and negative driven codes. The negative track relay 4NTR is provided with its own repeating relay 4NTP, but a track repeating relay 4TP is also provided which is responsive to the operation of either the negative track relay 4NTR or the positive track relay 4PTR. Another repeater relay 4NTPP is provided to repeat the negative repeater relay 4NTP subject to the indications of the signal 4A as repeated by its associated relay 4AGYP.

In Figs. 1D and 1E polarized inversed codes are also employed. This requires that a repeater 3AFPP of the approach repeating relay 3AFP be employed to pole change the polarity of the inverse code pulses applied to the track section 4T. At the other end of the track circuit, positive and negative approach relays 4PAR and 4NAR are provided, which relays are of the usual two-position polar type relays as indicated in the drawings. The positive relay 4PAR is provided with a repeater relay 4PAFP which indicates when a train is approaching the interlocking plant. Similarly, the negative approach relay 4NAR is provided with a front repeater 4NAFP and a back repeater 4NAFBP. The relay 4NAFBP controls the highway crossing signal, as above mentioned, and is in turn controlled by the relay 4PAFP so that the relay 4NAFBP is deenergized only when a train is in the track section 4T approaching the highway crossing. This operation will, of course, be considered in detail hereinafter.

It is believed that further features of the present invention will be best understood by a description of various typical operations so that any other characteristic features of the various devices will be discussed in connection with such typical operations.

OPERATION

Before considering the details of operation with specific reference to the circuits, it may be well to outline the general relationships involved in certain typical traffic conditions so as to give perspective to the various details. For the purpose of illustrating the relationships between the codes in the various track circuits, under different traffic conditions, a series of diagrams has been shown. Each of these diagrams shows the direction of code transmission and the different distinctive codes in the various track sections under the conditions assumed, so that the detail operations of the system may be more readily understood in referring to the circuits of the disclosure.

Figure 5A:
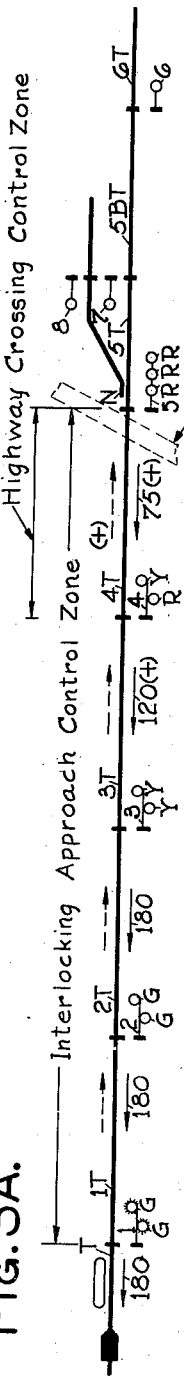

In these diagrams of the operation, of which Fig. 5A is typical and shows the normal conditions, it will be noted that the driven codes are represented by arrows with solid line shafts, while the inverse codes are represented by arrows with dotted line shafts. The driven codes may be of different distinctive code rates, such as 75 pulses per minute, 120 pulses per minute, and 180 pulses per minute, and these driven code rates are produced by suitable coders or code oscillators at the ends of the track sections where the driven codes originate. These driven codes, illustrated by the arrows with solid line shafts, have been indicated in the diagrams as having particular rates under the conditions assumed for any one diagram by associating therewith the number 75, 120 or 180, as the case may be. However, inasmuch as the inverse codes are produced as a result of their associated driven codes, and always take the rates of such driven codes, no rate designation has been associated with the arrows having dotted line shafts to indicate the presence of such inverse codes. Also, the code pulses on the track rails for these driven and inverse codes in certain track sections may be of either positive or negative polarity as suitably selected. Thus, for those track sections where the polarity of the codes may be changed, the arrows representing such codes also have a (+) or (—) associated therewith to indicate the polarity of the codes under the conditions assumed. The absence of code in a track section has been indicated in the diagrams by an oblong zero.

As above mentioned, the diagram of Fig. 1A indicates the normal conditions of code for the portion of system disclosed in Figs. 1A–1E (and modification of Fig. 3) while the home signal 5 is held at stop, and the interlocking approach control zone is still unoccupied. From this diagram, it will be seen that with the home signal 5 held at stop, a 75 (+) code is caused to be transmitted to the rear which causes the signal 4 to indicate yellow over red (Y/R). This condition causes a 120+ code to be transmitted toward signal 3 to give it an indication of yellow over yellow (Y/Y). This condition of signal 3 causes a 180 code to be transmitted to the rear for causing signal 2 to indicate green over green (G/G), which condition is, of course, repeated by a 180 code for the signal 1 causing it to also indicate green over green (G/G).

Figure 5B:
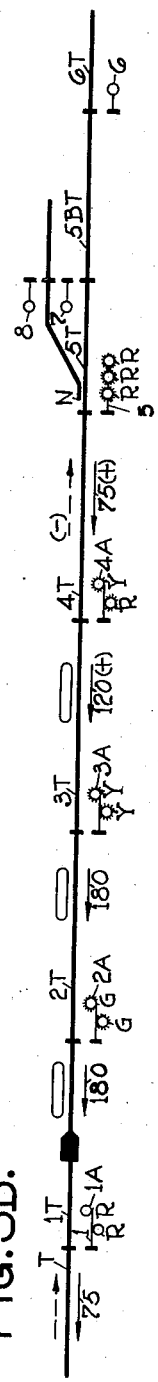
Figure 5C:

When there is no train within the interlocking approach control zone (indicated by the extent of the long arrow in Fig. 5A), there is an inverse code in each of the track sections 1T, 2T, 3T and 4T. The inverse code in sections 1T, 2T and 3T is always of the same polarity, but the inverse code in the section 4T is normally of positive (+) polarity which changes to a negative (—) polarity when a train enters the interlocking approach control zone as indicated in Fig. 5B.

The entrance of the train into the interlocking approach control zone causes the tumble-down effect of the inverse codes to act at signal 4 to change the polarity of the inverse code in the track section 4T which indicates at the home signal 5 the approach of the train for approach locking the track switch W, but at the same time maintains the highway crossing signal at rest conditions because of the presence of the negative inverse code.

The train entering the interlocking approach control zone proceeds on the indications of the signals as shown, which signals have been approach lighted by the tumble-down operation just described. When it enters the highway crossing control zone as indicated in Fig. 5E, the inverse code of track section 4T is removed causing the highway crossing signal to be set into operation, and also to continue the approach locking of the track switch W.

In brief, then, the inverse codes are used for approach control of the switch locking as well as for the highway crossing control. The polarizing of the inverse code in the track section 4T serves to distinguish as to whether or not the train has entered the interlocking approach control zone without setting the highway crossing signal into operation.

The Figs. 5B to 5E show the conditions of coding in the various track sections after a train has entered the approach control zone and is progressing from section to section toward the home signal 5 manually held at stop. It is to be understood that these diagrams of Figs. 5A to 5E apply both to the disclosure of Figs. 1A–1E and to the modified form of the disclosure where Fig. 3 is substituted for Fig. 1E.

The diagrams of Figs. 5F to 5J are very similar to the diagrams of Figs. 5A to 5E, except in these Figures 5F to 5J the home signal is assumed to have received a manual clear control, as indicated in these diagrams by suitable legends. This manual control, assumed to have been exercised on the home signal 5, causes such home signal to display indications as represented by the letters associated therewith in the diagrams in a manner to show what the home signal indicates for both the Figs. 1E and 3. These diagrams also bring out that different codes are transmitted while the home signal is clear depending upon the position of the switch after a train has entered the approach control zone, as will be more clearly understood as the description progresses.

Figure 5D:
Figure 5E:
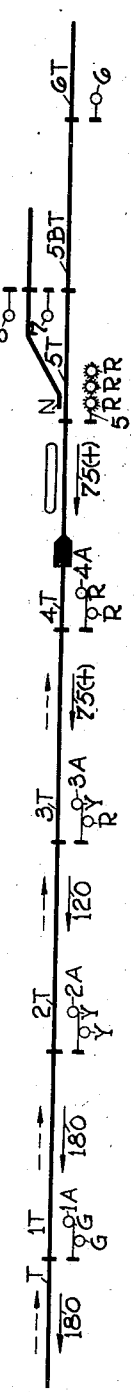
Figure 5F:
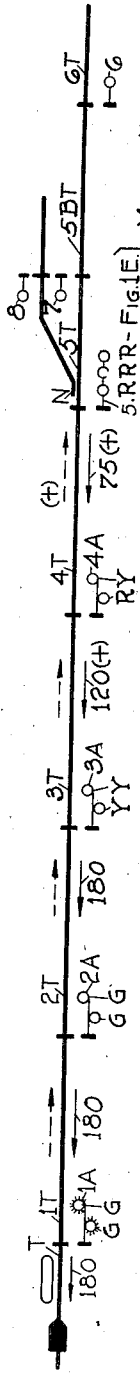
Figure 5G:
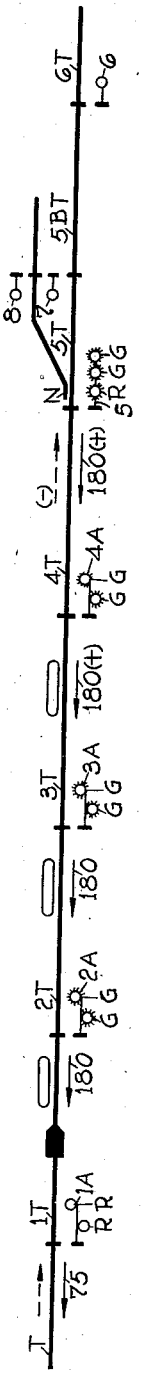
Figure 5H:
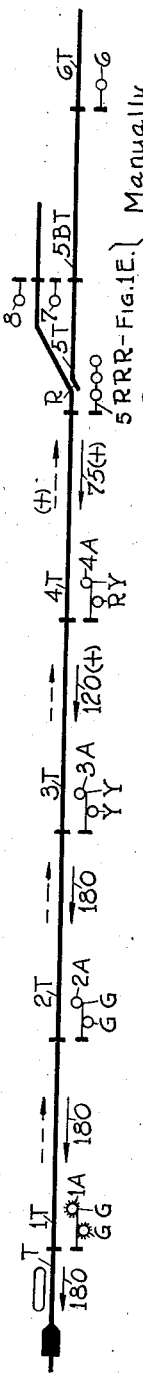

Considering that there is no train within the interlocking approach control zone as indicated in Fig. 5F, it will be seen that the presence of a clear control for the home signal 5 causes no change in the codes transmitted toward the distant signals 3 and 4. But when a train enters the interlocking approach control zone, it causes the tumble-down of the inverse codes which results in the change in polarity of the inverse code in section 4T (see Fig. 5G). This change in polarity of the inverse code as received at the home signal permits the manual control for the home signal to become effective in either of two different sequences as shown in Fig. 1E or Fig. 3, to increase the code rates in the track sections 3T and 4T as indicated in Fig. 5G so as to permit the approaching train to proceed on clear high speed signal indications.

In the form of Fig. 1E, the manual control for clearing signal 5 cannot become effective to clear that signal until the train has entered the interlocking approach control zone and caused the tumble-down effect to take place, although the manual act of controlling the signal by movement of the signal lever has been performed for some time prior to the entrance of the train into the control zone including track section 1T, for example. The clearing of the home signal 5 then causes the increase of the code rates as shown in Fig. 5G. In other words, the operator may perform the act of controlling signal 5 at any time it is safe for the signal 5 to be cleared, but in accordance with the principles of the invention, as disclosed in the form of Fig. 1E, the signal 5 cannot actually display a clear indication until the train has entered the approach control zone to cause an indication of such train to be present at the home signal 5 and act on the approach locking for the switch W. On the other hand, the form of Fig. 3 provides that the manual control for the home signal 5 can cause the immediate clearing of the home signal 5 providing traffic conditions are proper but the code rates for the approach signals 3 and 4 cannot be increased until the approach control has taken effect. In this way, a check on the reliability of the approach control is provided.

Figure 5J:
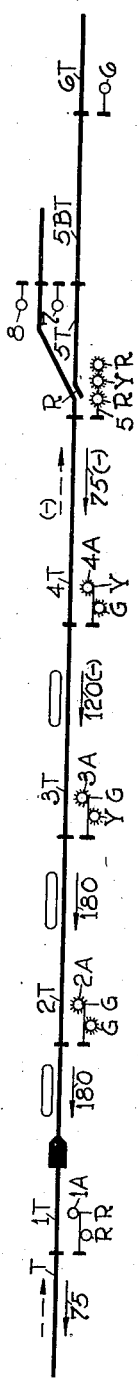

These general conditions of operation are the same for an approaching train regardless of whether the route is to be established over the switch W in the normal position or in the reverse position. It is, of course, to be understood that the signals are caused to give different indications when the route is over the track switch in a reverse position. This is indicated in Fig. 5J where the driven codes in the track sections 3T and 4T are given a negative polarity in order to give the approach signals 3 and 4 different signal indications for the medium speed route then set up over the track switch W in a reverse position.

*Normal conditions*

With the home signal 5 at stop and its repeater relays deenergized (see Fig. 1E), the approach route locking relay 5ASR is normally energized by a circuit closed from (+), and including back contact 20 of relay 5BGYP, back contact 21 of relay 5AGP, back contact 22 of relay 5AYP, front contact 23 of relay 4PAFP, winding of relay 5ASR, to (−).

With the relay 5ASR picked up, a circuit is also closed for the directional stick relay 5ES associated with the track section 5T. This circuit extends from the heel of back contact 22 of relay 5AYP, through back contact 24 of thermal relay 5TH, front contact 25 of relay 5ASR, front contact 26 of relay 5TR, windings of relay 5ES, to (−).

With the signals 7 and 8 at stop their yellow repeater relays are, of course, both deenergized so that the stick route locking relay 7—8SR is energized over its stick circuit from (+), and including back contact 27 of relay 7YP, back contact 28 of relay 8YP, coil of heating element of thermal relay 7—8TH, front contact 29 of relay 7—8SR, windings of relay 7—8SR, to (−).

The energization of relay 7—8SR causes the directional stick relay 5WS to be energized by reason of a circuit closed from (+), and including front contact 30 of relay 7—8SR, front contact 31 of relay 5TR, windings of relay 5WS, to (−).

Thus, the lock relay LR is energized by a circuit closed from (+), through a circuit including front contact 32 of relay 5WS, front contact 33 of track relay 5TR, front contact 34 of relay 5ES, windings of relay LR, to (−). The picked up conditions of the locked relay LR closes front contact 35 so that the switch machine control lever SML can control the switch machine SM through the medium of the relay WZ in the usual manner.

As above mentioned, the repeater relays for the home signal 5 are all deenergized. This condition causes the positive code transmitting relay 4PCP to be energized at the 75 code rate by reason of a circuit closed from (+), and including front contact 36 of relay 5WS, oscillator contacts 75C, back contact 37 of relay 5AYP, back contact 38 of relay 5AGP, back contact 39 of relay 5BGYP, windings of relay 4PCP, to (—).

The operation of the polar contact 40 of relay 4PCP in accordance with the 75 code rate causes a 75+ code to be impressed upon the track section 4T, each impulse of which is made up of half waves of alternating current. More specifically, when the contact 40 is in a left-hand position, energy flows from the right-hand terminal of the transformer 205 through the variable resister 41, rectifier unit 42, polar contact 40 in an operated position, polar contact 43 in a non-operated position, over the upper rail of track section 4T (see Fig. 1D), through polar contact 44 in a non-operated position, variable resister 45, windings of relays 4PTR and 4NTR, over the lower rail of track section 4T, to the left-hand terminal of the transformer 205 associated with relay 4PCP. The positive code impulses which flow over the circuit just traced cause the operation of the positive track relay 4PTR, but the negative track relay 4NTR remains in its biased non-operated position.

Each time the positive track relay 4PTR is operated by a code impulse, such operation is repeated by the repeating relay 4TP which has a circuit closed from (+), and including back contact 46 of relay 4NTP, polar contact 47 of relay 4PTR in an operated position, windings of relay 4TP, to (—).

Each time the repeating relay 4TP shifts its polar contact 48 to an opposite position, it causes a reversal in the direction of current flow in the primary winding of the decoding transformer 200 which induces current in the secondary winding of that transformer which is rectified by the polar contact 49 of relay 4TP so that the home relay 4HR is picked up by reason of the successive code impulses of the 75+ code.

Before considering the manner in which the relay 4HR causes the signals 4A and 4B to give an approach indication, it is believed expedient to point out how an inverse code is transmitted over the track section 4T for withholding the highway crossing signals as well as providing approach route locking control. Each time the positive track relay 4PTR actuates its polar contact 47 to a right-hand position, the primary winding of the transformer 201 is energized which induces a current in the secondary winding of that transformer connected directly across the windings of the relay 4ACP. But such current flow does not actuate the polar contacts of the relay 4ACP because it is of such direction as to more strongly hold polar contact 44 in its biased position.

Specifically, the circuit for the transformer 201 is closed from (+), and includes back contact 46 of relay 4NTP, polar contact 47 of relay 4PTR in a right-hand actuated position, front contact 50 of relay 4HR, primary winding of transformer 201, to (—). However, at the end of each impulse of the 75 code (or any other code, for that matter), the polar contact 47 of the track relay 4PTR assumes its biased position and deenergizes the primary winding of the transformer 201. This causes an induced current in its secondary winding which is of such a direction as to actuate the polar contact 44 momentarily to a right-hand position in which an inverse code pulse is caused to be applied to the track rails of track section 4T. The energy for the inverse code pulses is supplied from transformer 202, through a full-wave rectifier unit 203, and through the variable resistor 51 with polarity as determined by the position of contacts 52 and 53 of relay 3AFPP. With the inverse code in the preceding track sections of the approach control zone, then this relay 3AFPP is energized causing positive inverse code pulses to be impressed across the track section 4T. But these contacts 52 and 53 are pole changing contacts, and, if a train is in the approach control zone to the interlocking plant, there is no inverse code received by the relay 3AR which causes this relay 3AFPP to be deenergized to in turn cause the inverse code pulses applied to the track section 4T to be of negative polarity.

Positive inverse code pulses across the track section 4T are repeated by the positive approach relay 4PAR, but are not repeated by the negative approach relay 4NAR. On the other hand, negative inverse code pulses are repeated by the negative approach relay 4NAR, but are not repeated by the positive approach relay 4PAR. The reception of the positive inverse code pulses causes the polar contact 54 of relay 4PAR to be operated intermittently energizing its slow release repeating relay 4PAFP. This relay in turn closes front contact 55 to energize the negative approach front-back repeater relay 3NAFBP through an obvious circuit.

The continued energization of the relay 4PAFP maintains back contact 56 open so that the home signal 5 cannot be cleared until a train enters the interlocking approach zone as will be later described. Also, the continued energization of the relay 4NAFBP maintains back contact 57 open so that the highway crossing signals are not in operation.

Returning to Fig. 1D, the energization of the relay 4HR completes an energizing circuit for the signal mechanism 4A with such a polarity as to cause it to indicate yellow while the lower signal mechanism 4B is still indicating red. This energizing circuit for signal mechanism 4A is closed from (+), through a circuit including front contact 58 of relay 4HR, back contact 59 of relay 4VR, operating winding of signal mechanism 4A, back contact 60 of relay 4VR, front contact 61 of relay 4HR, to (—).

With the signal mechanism 4A indicating yellow, its green-yellow repeating relay 4AGYP is energized by a circuit closed from (+), and including front contact 58 of relay 4HR, front contact 62 of signal mechanism 4A, back contact 63 of signal mechanism 4A, windings of relay 4AGYP, front contact 61 of relay 4HR, to (—).

With the signal 4 thus indicating yellow/red to advise an approaching train to prepare to stop at the next signal, conditions are such as to cause 120+ code to be impressed on the track section 3T for controlling the signal 3 (see Fig. 5A). More specifically, the positive code transmitting relay 3PCP is energized by a circuit closed from (+), and including the oscillator contacts 120C, front contact 64 of relay 4AGYP, back contact 65 of relay 4BGYP, front contact 66 of relay 4HR, windings of relay 3PCP, back contact 67 of relay 4NTP, to (—). This positive code transmitting relay 3PCP is thus operated at the 120 code rate causing its contact 68 to be operated and thus apply the positive code pulses to the track section 3T by an obvious circuit, similar to that pointed out in connection with the transmitting relay 4PCP of Fig. 1E.

The 120+ code is received at the signal 3 location by the positive track relay 3PTR (see Fig. 1C) which operates its contact in response to such pulses to close a circuit for the track repeating relay 3TP from (+), and including back contact 69 of relay 3NTP, polar contact 70 of relay 3PTR in an operated position, windings of relay 3TP, to (—).

The operation of the polar contact 71 of the track repeating relay 3TP to its opposite positions in accordance with the 120+ code rate, causes the relay 3HR to be energized through its associated decoding transformer 221 in the usual manner. The center secondary of this decoding transformer 221 supplies a resonated circuit with energy impulses which are effective to energize the relay 3BHR inasmuch as this circuit is resonated for the 120 code rate. However, it is noted that the connection of this relay 3BHR across its associated rectifier includes front contact 73 of relay 3AGYP so that the relay 3BHR cannot be energized in response to the 120+ code rate unless the upper arm 3A of signal 3 is caused to indicate at least yellow in response to the energized condition of the relay 3HR.

More specifically, the operating winding of signal mechanism 3A is energized from (+), through a circuit including front contact 74 of relay 3HR, back contact 75 of relay 3VR, back contact 76 of relay 3BDR, operating winding of signal mechanism 3A, back contact 77 of relay 3BDR, back contact 78 of relay 3VR, front contact 79 of relay 3HR, to (—).

With the signal mechanism 3A indicating yellow, a circuit is closed for the green-yellow repeating relay 3AGYP from (+), through a circuit including front contact 80 of signal mechanism 3A, back contact 81 of signal mechanism 3A, windings of relay 3AGYP, front contact 82 of relay 3HR, to (—).

The energization of the relay 3AGYP closes front contact 73 and permits relay 3BHR to be picked up in accordance with the 120+ code. This closes a circuit for the energization of the lower arm mechanism 3B of signal 3 from (+), through a circuit including front contact 74 of relay 3HR, back contact 75 of relay 3VR, front contact 83 of relay 3BHR, operating winding of signal mechanism 3B, front contact 84 of relay 3BHR, back contact 78 of relay 3VR, front contact 79 of relay 3HR, to (—).

The display of a yellow indication by the lower arm mechanism 3B of signal 3 closes an energizing circuit for its green-yellow repeater 3BGYP from (+), and including front contact 85 of signal mechanism 3B, back contact 86 of signal mechanism 3B, windings of relay 3BGYP, front contact 87 of relay 3BHR, to (—).

With both the upper and lower arm mechanism 3A and 3B indicating yellow, the signal 3 is then giving the aspect of yellow/yellow to advise an approaching train that it must prepare to stop at the second signal so that it is then possible for a 180 code to be transmitted toward the signal 2 to give it a proceed high-speed indication of green/green. This is accomplished by reason of an energizing circuit for the code transmitting relay 2CP closed from (+), through a circuit including oscillator contacts 180C, front contact 88 of relay 3BGYP, front contact 89 of relay 3HR, windings of relay 2CP, to (—).

The operation of the transmitter relay 2CP at the 180 code rate causes its polar contact 90 to apply code impulses across the track section 2T by reason of an obvious circuit. These impulses are received by the track relay 2TR associated with signal 2 (see Fig. 1B) and its contacts 290 and 91 act through its associated decoding transformer 222 to energize the relay 2HR. The action of polar contact 290 of relay 2TR on the decoding transformer 222 causes impulses to be transmitted through the secondary winding of the associated decoding transformer into the resonated circuit for the relay 2DR. This circuit is resonated for the 180 code rate causing the relay 2DR to be picked up. It is noted that this 180 code rate does not act on the resonated circuit for the 120 code rate associated with the relay 2BHR, but the relay 2BHR is provided with a local circuit to effect its energization under certain conditions, as will presently be described.

It may be noted in this connection that the circuits for these signal controlling relays 2HR, 2BHR and 2DR are so associated as to cause the upper and lower arms of the signal 2 to display their indications in a predetermined sequence upon the initial reception of a code so as to cause such signal to progressively display its aspects beginning with the most restrictive until it reaches the aspect called for by that particular code then being received.

For example, the initial reception of this 180 code causes the picking up of the relay 2HR and the picking up of the relay 2DR at substantially the same time, but the signal mechanism 2A is required to indicate yellow before the relay 2BHR can be energized. The energization of the relay 2BHR causes the signal mechanism 2B to indicate yellow which in turn causes the energization of the relay 2VR which then changes the polarity on both of the signal mechanisms 2A and 2B so as to cause them to indicate green. From this, it can be seen that the initial arrival of a 180 code at a signal location causes that signal to indicate progressively the various signal aspects as they build up from stop, namely, R/R; Y/R; Y/Y; G/G. With reference to the chart of signal indications or aspects, it will be noted that G/Y and Y/G are omitted as these are approach indications for the medium speed route through the interlocking and are not required in automatic block territory as represented by the signal 2 or the signal 1, for example. This operation discussed in detail for signal 2 is to be considered typical of all such automatic block signals.

The specific circuits will now be pointed out without regard to the order in which they are closed as this will be understood from the description just given. The relay 2BHR is energized from (+) through a circuit including front contact 92 of relay 2DR, front contact 93 of relay 2AGYP, windings of relay 2BHR, front contact 94 of relay 2DR, to (—). Energy cannot flow from this circuit through the rectifier unit associated with relay 2BHR because the rectifier is oppositely poled.

The relay 2VR is energized from (+) through a circuit including front contact 95 of relay 2BGYP, front contact 96 of relay 2DR, windings of relay 2VR, to (—).

Relay 2AGYP is energized from (+) through a circuit including front contact 97 of signal mechanism 2A in a green indicating position, back contact 98 of signal mechanism 2A in a green indicating position, windings of relay 2AGYP, front contact 99 of relay 2HR, to (—). The relay 2BGYP is energized from (+), through a circuit including front contact 100 of signal mechanism 2B in a green indicating position, back contact 101 of signal mechanism 2B in a green indicating position, windings of relay 2BGYP, front contact 102 of relay 2BHR, to (—).

The operating winding of the signal mechanism 2A is energized from (+), through a circuit including front contact 103 of relay 2HR, for contact 104 of relay 2VR, operating windings of signal mechanism 2A, front contact 105 of relay 2VR, front contact 106 of relay 2HR, to (—). The current which flows in this circuit is of such a polarity as to cause the signal mechanism 2A to be operated to a green indicating position.

The operating winding of the signal mechanism 2B is connected in multiple with the operating winding of signal mechanism 2A by front contacts 107 and 108 of relay 2BHR, so that it receives the same polarity and is caused to indicate green.

With the signal 2 indicating G/G, the code transmitting relay 1CP is energized from (+), through a circuit including oscillator contacts 180C, front contact 109 of relay 2BGYP, front contact 110 of relay 2HR, windings of relay 1CP, to (—). The operation of its polar contact 111 in accordance with the 180 code rate applies a 180 code to the track section 1T which is received by the track relay 1TR in the signal location 1.

The operation of the polar contact 112 of track relay 1TR (see Fig. 1A) to an operated position causes the front repeating relay 1TFP to be energized by an obvious circuit so that when the polar contact 112 is in a non-operated position between successive impulses of any code, energy can flow through front contact 113 of relay 1TFP to energize the front-back repeater 1TFBP. The front repeating relay 1TFP is sufficiently slow release to remain picked up during the time spaces between successive impulses of any code including even the lowest rate code such as 75 in this case. Similarly, the front-back repeater relay 1TFBP is sufficiently slow-acting to remain energized during the impulse periods of each code including even the slowest rate code such as 75 in this case.

While the polar contact 112 is in a non-operated position with the front back repeater relay 1TFBP picked up closing front contact 114, the relay 1HR is energized, which relay 1HR is also sufficiently slow-acting to remain picked up during the impulse periods of even the slowest rate code.

While the track relay 1TR is deenergized with the front-back repeating relay 1TFP picked up, a circuit is closed from (+) through polar contact 115 in a non-operated position, front contact 116 of relay 1TFP, winding of relay 1TP, to (—). Thus, each time the track relay 1TR is energized, the relay 1TP is deenergized so that this relay 1TP repeats the various codes impressed upon the associated track section 1T. The operation of the polar contact 117 of relay 1TP in response to a 120 code rate causes the relay 1BHR to be energized, while operation of polar contact 117, in response to a 180 code rate causes the relay 1DR to be energized. Also, these relays 1BHR and 1DR control the signal mechanisms 1A and 1B in exactly the same way as described for signal 2, it being noted that a relay 1VR is used to cause the same sequences in the display of indications when it initially receives a code rate as described for signal 2.

With the signal 1 caused to indicate G/G, it is obvious that the code rate placed on the track section T in the rear of this signal should also be of the 180 rate and the relay CP is thus controlled accordingly.

The transmission of a code over the track section T results in the return of an inverse code which is, of course, repeated by the approach relay AR. The operation of the approach relay AR causes its polar contact 118 to energize a front approach repeater relay AFP and when it is picked up, a circuit is closed for the front-back repeating relay AFBP through contact 119 during the deenergized periods of the inverse code. These front-back repeaters AFP and AFBP are similarly slow-acting as the relay 1TFP and 1TFBP so as to remain picked up during their periods of deenergization for even the slowest code rate. When a train enters the track section T preventing the transmission of an inverse code towards the signal 1, then the relay AR ceases its operation and the relays AFP and AFBP drop away in the sequence named. The deenergization of relay AFBP closes back contact 120 which supplies energy to the lamps 121 and 122 of the signal mechanisms 1A and 1B to provide the approach lighting feature.

At the end of each driven code pulse received by the track relay 1TR, the relay 1TP is energized, and while it is picking up its polar contact 123, the approach code transmitting relay 1ACP is energized from (+), through a circuit including polar contact 115 of relay 1TR in a non-operated position, front contact 116 of relay 1TFP, back contact 123 of relay 1TP in a non-operated position, windings of relay 1ACP, to (—). This momentary energization of the relay 1ACP causes an inverse code pulse to be impressed on the track section 1T between each of the driven code pulses received at this signal location.

The reception of inverse code pulses at the right-hand end of the track section 1T is, of course, repeated by the approach relay 1AR which operates its polar contact 124 in response to each impulse to energize its front repeating relay 1AFP. Any time that these inverse code pulses cease to be received, the relay 1AFP drops away and closes its back contact 125 for approach lighting the associated signal 2.

Under normal conditions, the relay 1AFP remains energized closing its front contact 126 so that an inverse code is impressed upon the rails of the track section 2T while the track relay 2TR is receiving a driven code. This inverse code is impressed on the track section 2T by reason of the inductive control of the relays 2ACP similar to that described in detail for the relay 4ACP associated with the signal 4 in Fig. 1D.

However, it is to be understood that circuit means such as shown in Fig. 1A might be employed instead of this inductive control if desired. The inverse code on track section 2T is received by the relay 2AR and repeated by the relay 2AFP in a manner which is obvious. The picked up condition of the relay 2AFP while an inverse code is being received closes its front contact 127 to allow an inverse code to be impressed upon the track section 3T while a driven code is being received by either the track relay 3PTR or 3NTR. Also, back contact 128 of relay 2AFP is provided for approach lighting the signal 3 when such inverse code ceases upon entrance of a train into the approach control zone.

The reception of the inverse code by the approach relay 3AR is, of course, repeated into its front repeater 3AFP, but whenever the inverse code ceases, it closes its back contact 129 to approach light the signal 4. The front contact 130 of relay 3AFP is provided for controlling its repeater relay 3AFPP in such a way that whenever an inverse code is received by the approach relay 3AR, the relay 3AFPP is energized so that the inverse code in track section 4T is of positive polarity, but whenever this relay 3AFPP is deenergized, the inverse code in section 4T is of negative polarity, previously explained in detail.

From the above description, it will be appreciated that the inverse codes in the sections 1T, 2T and 3T are arranged to provide a tumble down effect so that the cessation of the inverse code in track section 1T is repeated in the track sections 2T and 3T. However, the cessation of the reception of an inverse code at the right-hand end of the track section 3T does not cause the inverse code in section 4T to cease but merely changes its polarity from positive to negative. The various operations involved will be best understood by considering in detail the operations occurring upon the entrance of a train.

*Train enters interlocking approach control zone*

With the system in the normal condition as just described and as indicated in Fig. 5A, let us assume that a train enters the track section 1T having accepted the signal 1 displaying the aspect of G/G for a high-speed train movement. As soon as the train enters the track section 1T, it shunts the rails thereof and causes the track relay 1TR to remain deenergized. This, of course, causes the dropping away of the relays 1HR and 1DR followed by the release of the relay 1BHR, thus causing the signal 1 to display R/R for stop. With the signal 1 at stop, the code transmitting relay CP is caused to transmit a 75 code in the rear of the signal 1 by reason of closed back contact 330 so as to permit a following train movement.

The entrance of the train into the track section 1T shunts the track rails thereby stopping the track relay 1TR from following the driven code applied at the exit end of such section. This, of course, stops the transmission of any inverse code by the relay 1ACP. The cessation of the inverse code in section 1T causes the relay 1AFP to drop away opening contact 126. This causes the inverse code in section 2T to cease so that front contact 127 of relay 2AFP is open to cause the inverse code in section 3T to cease. The opening of front contact 130 of relay 3AFP causes the relay 3AFPP to release to change the polarity of the inverse code in the section 4T.

The cessation of positive inverse code in the section 4T causes the relay 4PAFP to release opening its front contact 55 and closing its back contact 56. But the relay 4NAFBP is maintained energized because the reception of the negative inverse code is repeated by the negative approach relay 4NAR having a contact 131 which, when operated, closes an energizing circuit for the front repeater 4NAFP that is sufficiently slow release to remain picked up by the successive inverse code impulses. With this relay 4NAFP picked up, the release of contact 131 of relay 4NAR between successive inverse code pulses closes a pick-up circuit for the relay 4NAFBP through a circuit including front contact 132 of relay 4NAFP. Thus, this relay 4NAFBP is maintained picked up which keeps the back contact 57 open so that the highway crossing signals are maintained at rest.

The closure of back contact 56 or relay 4PAFP, due to the presence of a train in the approach control zone, would permit the manual clearing of the home signal 5 (which will be later described), but for convenience in the description, the operation in clearing the home signal 5 will not be pointed out until after the operation of the system has been considered during the approach of a train with home signal 5 displaying R/R/R.

When the train enters the track section 1T, which is the first track section of the interlocking approach control zone, the cessation of the inverse codes in the sections 1T, 2T, and 3T together with the change in polarity in track section 4T causes the signals 2, 3, 4 and 5 to be approach lighted as indicated in Fig. 5B. In connection with the illustrations of Figs. 5A–5J, it will be seen that the control of the respective signals is indicated by the letters G, Y and R immediately beneath the signal symbols, but the symbols themselves indicate whether or not the corresponding signal is illuminated. Thus, as the train passes in an eastbound direction through the track sections 1T, 2T, 3T and 4T, it passes the signals 2, 3, and 4 giving the indications illustrated in Figs. 5B, 5C, 5D and 5E.

A code is placed on each section in the rear of the train so as to permit a following train movement (see Figs. 5B–5E). More specifically, the train in the track section 2T causes the transmitter relay 1CP to transmit a 75 code over the track section 1T by reason of the back contact 110 of the relay 2HR being closed while the train is in this track section 2T (see Fig. 1B).

When the train is in the section 3T, the transmitter relay 2CP is caused to transmit a 75 code by reason of a circuit closed from (+), and including back contact 133 of relay 3NTP, oscillator contacts 75C, back contact 89 of relay 3HR, windings of relay 2CP, to (—). This 75 code is received by the track relay 2TR causing the picking up of the relay 2HR which in turn causes the signal 2 to display a Y/R aspect. More specifically, the signal mechanism 2A is energized by reason of a circuit code from (+), and including front contact 103 of relay 2HR, back contact 105 of relay 2VR, operating windings of signal mechanism 2A, back contact 104 of relay 2VR, front contact 106 of relay 2HR, to (—). The signal mechanism 2B, of course, cannot be energized because of open contacts 107 and 108 of relay 2BHR.

With the signal mechanism of signal 2A actuated to a position to display yellow, then the relay 2AGYP is energized by reason of the closure of front contact 98 and back contact 97. Thus, a 120 code is caused to be transmitted over the section 1T by reason of the circuit for the code transmitting relay 1CP closed from (+), and including oscillator contacts 120C, front contact 134 of relay 2AGYP, back contact 109 of relay 2BGYP, front contact 110 of relay 2HR, windings of relay 1CP, to (—).

This 120 code impressed upon the track section 1T causes the signal 1 to display a Y/Y signal aspect which in turn causes a 180 code to be impressed upon the track section T (see Fig. 5D). The initial application of the 120 code to the track section 1T is first repeated by the relay 1HR which, when it picks up, causes the signal mechanism 1A to display yellow causing the energization of the relay 1AGYP so that it closes front contact 135 to permit the energization of the relay 1DHR in accordance with the 120 code as received over its resonated circuit. When the relay 1BHR picks up, it connects the operating winding of signal mechanism 1B to the control for the signal mechanism 1A by the closure of contacts 198 and 199. Thus, both signal mechanisms 1A and 1B are actuated to their yellow displaying positions.

Train enters highway crossing control zone

Assuming that the eastbound train passes the signal 4 displaying a Y/R aspect, then the train must proceed to stop in approach to the home signal 5 in accordance with the rule for such an aspect (see chart of Indications and aspects given above). The entrance of the train into the track section 4T stops the reception of driven code by the track relay 4PTR and the associated decoding apparatus so as to cause the signal 4 to indicate stop, and, of course, also causes the cessation of all inverse code transmission in the track section 4T. This, of course, causes the relays 4NAFP and 4NAFBP to become deenergized closing back contact 57 to initiate the operation of the highway crossing signals in the usual way. The detail control for the highway crossing signals has not been shown, as it is to be understood that any suitable type of highway crossing signal and the necessary control therefore may be set into operation by the closure of back contact 57.

The train in the track section 4T causes the 75 code to be impressed on the track section 3T to cause the signal 3 to display a Y/R aspect. Such conditions cause the 120 code to be impressed upon the track rails of section 2T, which in turn causes a 180 code to be impressed upon the track section 1T as indicated in the diagram of Fig. 5E. As above mentioned, all of the signals including the home signal 5 are approach lighted upon the entrance of a train into the interlocking approach control zone. On the other hand, the signals in the rear of the train are not illuminated, but their signal mechanisms are operated to the proper positions so that if a following train should cause their illumination, it would receive the proper indications in accordance with traffic conditions.

From the above description, it will be seen that the highway crossing signal control extends merely from the signal 4; while the approach control for the interlocking extends from the signal 1. It is possible to do this in accordance with the organization of the system of the present invention by reason of the use of polarized inverse codes in the track section 4T.

Manual control of home signal

Let us assume that there is no train in the interlocking approach control zone but that the operator desires to clear the home signal 5 or at least prepare it for clearing upon the entrance of a train into the approach control zone. In this connection, it is noted that the present invention provides two forms. The first form shown in Fig. 1E provides that the operator may perform the manual act for the control of the home signal, but the home signal does not assume other than a stop position until a train enters the interlocking approach control zone and causes the approach control to become effective and at the same time causes the back contacts 146 and 56 of relay 4PAFP to be closed to approach light signal 5 and to permit the signals to be manually cleared. Then codes are impressed on the track section in the rear of the home signal to cause the approach signals to display less restrictive indications.

More specifically, let us assume that the operator actuates the signal control lever 5SL to a right-hand position. This applies energy to the relay 5GZ from (+) through a circuit including lever 5SL in a right-hand position, windings of relay 5GZ, back contact 136 of relay 5RR, to (−). As soon as the relay 5GZ picks up, it closes its front contact 137 to complete a stick circuit for the relay 5GZ independent of the energization of the relay 5RR but dependent upon the operated condition of the signal control lever 5SL.

The picking up of the relay 5GZ, with the track switch W in the normal position in correspondence with its remotely controlled relay WZ, closes a circuit for energizing the relays 5RR and 7RR in series from (+), through a circuit including front contact 138 of relay 5GZ, windings of relay 5RR, front contact 139 of the normal correspondence relay NCR, windings of relay 7RR, back contact 140 of relay 7GZ, to (−).

These circuits for interlocking the home signal 5 with the signals 7 and 8 for the opposite direction are the same as shown in the prior patent to S. N. Wight, Patent No. 2,027,569, dated January 14, 1936.

The distant relay 5ADR is controlled over a line circuit in accordance with the clear, caution or stop conditions of the signal 6 as indicated by the polar-neutral relay 6GYP. This relay 6GYP is energized to one position or the other depending upon whether the signal 6 is giving a clear or caution indication, and is deenergized whenever the signal 6 is at stop. This line circuit for the relay 5ADR includes front contact 141 of relay NCR, front contact 142 of relay 5TR, front contact 143 of relay 5BTR, front contact 144 of relay 6GYP, and polar contact 145 in one energized position to apply (B+) and in the other energized position to apply (B−).

Similarly, the distant relay 5BDR for signal 5B is energized over a line circuit including front contact 147 of relay NCR, front contact 148 of relay 5TR, front contact 149 of relay 5BTR, front contact 150 of relay 6GYP, to (B+).

If the track switch W is reversed then the relay 5ADR is deenergized but the relay 5BDR is energized with the same (B+) energy through front contact 151 of relay RCR and back contact 147 of relay NCR. Thus, it will be seen that the relay 5BDR may be a neutral relay but the relay 5ADR is a polar-neutral relay so as to be responsive to the polarity applied in accordance with the position of the relay 6GYP.

With traffic conditions proper in advance of the home signal 5, the switch W in a normal position, and the relays 5GZ and 5RR picked up, then the entrance of a train into the interlocking approach control zone causes the tumble-down effect through the inverse code in a manner above described to close the back contact 56 so that the signal mechanism 5A is energized over a circuit closed from (+), and including back contact 56 of relay 4PAFP, front contact 152 of relay 5RR, front contact 153 of relay 5GZ, front contact 154 of relay 5ADR, polar contact 155 of relay 5ADR in a left-hand position, operating winding of signal mechanism 5A, polar contact 156 of relay 5ADR in a left-hand position, front contact 157 of relay 5GZ, to (−).

Similarly, the signal mechanism 5B is energized over a circuit closed from (+), and including back contact 56 of relay 4PAFP, front contact 152 of relay 5RR, front contact 153 of relay 5GZ, front contact 154 of relay 5ADR, polar contact 155 of relay 5ADR in a left-hand position, front contact 158 of relay 5ADR, front contact 159 of relay 5BDR, operating windings of signal mechanism 5B, front contact 160 of relay 5BDR, front contact 161 of relay 5ADR, polar contact 156 of relay 5ADR in a left-hand position, front contact 157 of relay 5GZ, to (—).

With the operating mechanism 5A and 5B energized as above described, the signal 5 is caused to display a G/G/R aspect indicating proceed for a high-speed train movement over the main track with the track switch W in a normal position. This causes a 180+ code to be impressed on the track section 4T and which in turn causes a 180+ code to be impressed upon the track section 3T as indicated in Fig. 5G, thus, causing the signals 3 and 4 to both display G/G aspects so that the train entering the interlocking approach control zone at no time receives a restrictive indication but can travel at scheduled speed receiving G/G proceed indications at each of the signal locations. In connection with the control of the home signal 5, it should be noted that no control has been shown for the lower arm signal mechanism 5C of this signal. This mechanism 5C is for the purpose of providing the so called "call-on signal indications" in accordance with the usual practices, and it is believed unnecessary to point out how this signal may be manually controlled. It has merely been indicated for the purpose of rendering the indications of the home signal consistent with the various aspects employed for such a home signal in the usual interlocking practice. Thus, no explanation of the clearing of this signal mechanism 5C will be set forth, except to state that it may be manually cleared for restricted speed train movements for switching purposes under the usual situations found in interlocking plants.

More specifically, the operation of the signal mechanism 5A to a green displaying position energizes the relay 5AGP over a circuit closed from (+), and including back contact 162 of signal mechanism 5A, front contact 163 of signal mechanism 5A, windings of relay 5AGP, to (—).

The energization of the signal mechanism 5B to a green displaying position cannot cause the relay 5BGYP to be energized because the relay 5AGP opens back contact 164 and prevents its energization.

Thus, with the relay 5AGP energized, the positive code transmitting relay 4CPC is energized in accordance with a 180 code by reason of a circuit closed from (+), and including front contact 36 of relay 5WS, code oscillator contacts 180C, front contact 38 of relay 5AGP, back contact 39 of relay 5BGYP, windings of relay 4PCP, to (—). In this way, a 180 positive code is impressed upon the track section 4T. This code is received at the signal 4 by the track relay 4PTR which in turn causes the signal 4 to display a G/G aspect.

The reception of this 180+ code is, of course, repeated by the relay 4TP so that the relay 4HR is maintained energized and the relay 4DR is caused to pick up by reason of the energy supplied over its circuit resonated for the 180+ code rate. As soon as the relay 4DR picks up, it closes its front contacts 260 and 261 for energizing the relay 4BHR through contact 262 of relay 4AGYP which is energized because of the signal mechanism 4A being energized to its yellow displaying position.

As soon as the relay 4BHR picks up, it closes front contacts 182 and 183 for connecting the operating winding of the signal mechanism 4B in multiple with the operating winding of the signal mechanism 4A so that both mechanisms are then actuated to their yellow displaying positions. When the signal mechanism 4B is actuated to its yellow displaying position, the relay 4BGYP is energized by reason of a circuit closed from (+), and including front contact 186 of signal mechanism 4B, back contact 185 of signal mechanism 4B, front contact 187 of relay 4BHR, winding of relay 4BGYP, to (—).

When the relay 4BGYP picks up, a circuit is then closed for the relay 4VR from (+), and including front contact 263 of relay 4BGYP, front contact 264 of relay 4DR, windings of relay 4VR, to (—). The picking up of contacts 59 and 60 of the relay 4VR causes the reversal of polarity on the operating windings of the signal mechanisms 4A and 4B so that they are actuated to their green displaying positions. This, of course, causes the signal 4 to display its G/G aspect as above pointed out.

With the signal repeating relay 4BGYP energized, it is obvious that a 180+ code is impressed on the track section 3T by reason of the closure of its front contact 65. This 180+ code in the track section 3T is received at the signal 3 to cause it to display a G/G aspect in a similar manner as just described for the signal 4. Such G/G aspect displayed by the signal 3, of course, causes the relay 3BGYP to be picked up so that the 180 code in the track section 2T is maintained as under normal conditions (see Figs. 5A and 5G).

Route locking

Whenever the signal 5 indicates proceed, the approach route locking stick relay 5ASR is deenergized by reason of the picked up condition of one or more of the relays 5AGP, 5AYP, or 5BGYP. In this particular case the relay 5AGP is picked up opening back contact 21 to release the relay 5ASR. The opening of back contact 21 also deenergizes the relay 5ES which in turn opens its front contact 34 dropping the lock relay LR and opening contact 35 included in the switch control circuit. In this way, the picking up of the relay 5AGP effects the locking of the track switch W against manual operation at the same time that the front contact 38 of relay 5AGP causes the driven code for the track section 4T to be increased to the 180+ code rate. In other words, the code rate cannot be controlled for causing the distant approach signals 3 and 4 to give less restrictive indications until the approach control has been effective to open front contact 23 to assure that the relay 5ASR cannot be immediately released upon the manual restoration of the home signal 5 to stop in the face of an oncoming train.

More specifically, if the operator restores the signal 5 to stop, with a train in the approach control zone causing front contact 23 to be open, then the relay 5ASR is picked up only after a predetermined time measured by the thermal relay 5TH. This is because the closure of back contact 21 completes a circuit for the heating element of the thermal relay 5H from (+), and including back contact 20 of relay 5BGYP, back contact 21 of relay 5AGP, back contact 22 of relay 5AYP, heating element of thermal relay 5TH, back contact 364 of relay 5ASR, to (—).

After a predetermined time the front contact 24 of the thermal relay 5TH is closed causing energy to be applied from the heel of contact 22 to the winding of relay 5ASR causing it to be picked up. As soon as the relay 5ASR picks up and opens back contact 364, the heating element of the thermal relay 5TH begins to cool because the current which flows through the stick circuit of the relay 5ASR is of unsufficient value to maintain the thermal relay in an actuated condition. The closure of front contact 25 of relay 5ASR completes the pick-up circuit for the relay 5ES as above described. This, of course, releases the lock relay LR and permits the operation of the switch machine SM.

Assuming that the operator wishes to permit the train to proceed over the track switch W in the normal position with the home signal 5, cleared, then the train proceeds in the usual way in accordance with the signal indications. When it enters the track section 4T, the negative inverse code is shunted by the train so that the relay 4NAFBP is released causing the highway crossing signals to be set into operation.

When the train enters the track section 5T, the detector track relay 5TR is released causing the signals 5A and 5B to be restored to stop by reason of the opening of front contacts 142 and 148 in spite of any manual control provided therefore. The closure of back contact 165 also causes the relay 5ASR to be picked up by an obvious pick-up circuit in spite of the fact that the front contact 23 of relay 4PAFP is open. This is called detector release for the route locking.

The opening of front contact 26 of relay 5TR maintains the relay 5ES deenergized in spite of the restoration of the relay 5ASR. It may be noted here that the stick contact 166 of relay 5WS prevents the opening of front contact 31 from causing the deenergization of the relay 5WS, and for similar reasons the contact 167 is provided on relay 5ES for shunting front contact 26 of relay 5TR.

It should be noted that when a train is in the track section 4T, the home relay 4HR is dropped away, which closes a circuit through back contact 50 for energizing the primary winding of the transformer 201 at the 75 code rate. Each time the primary winding of the transformer 201 is deenergized, the relay 4ACP is momentarily operated to apply a follow-up code impulse to the track section 4T. These follow-up code impulses are of substantially the same duration as the usual inverse code impulses applied to such section and are applied to section 4T in the rear of a train. When the train entirely leaves the track section 4T, the normal driven code is, of course, applied to the track section 4T at the signal location 5 and this normal code has impulses of longer duration than the follow-up code so that the relay 4HR immediately picks up and causes a cessation of the application of the follow-up code. If there is no following train, then as soon as the relay 4HR picks up the normal inverse code is applied to track section 4T and the operation of the highway crossing signals is stopped. This is pointed out to show that the follow-up code in no way hinders the restoration of the system to normal, its real purpose being to stop the operation of the highway crossing signals when the normal driven code is removed by the clearing of either signal 7 or 8 as will be presently described.

The entrance of the train into the track section 5BT causes the relay 5BTR to be deenergized opening front contacts 143 and 149 to maintain the home signal 5 at stop, but when the train fully enters the track section 6T, the relay 6GYP is, of course, deenergized because the signal 6 is held at stop which causes (B—) potential to be applied to the distant control relay 5ADR through back contact 144. With the polar contacts 155 and 156 of relay 5ADR actuated to right-hand positions by this (B—) potential, the signal mechanism 5A is caused to indicate yellow which energizes the relay 5AYP from (+) to back contact 163 of signal mechanism 5A, front contact 162 of signal mechanism 5A, windings of relay 5AYP, to (—). This, of course, assumes that the signal control lever 5SL has been left in its actuated position so as to allow the home signal 5 to clear for a following train movement.

With the signal 6 held at stop by a train in the track section 6T, the relay 6GYP is deenergized, as above mentioned, opening front contact 150 so that the relay 5BDR is maintained deenergized. This causes the signal mechanism 5B to remain deenergized so that the home signal displays yellow/red/red aspect. The closure of front contact 37 of relay 5AYP with relay 5AGP deenergized causes a 120+ code to be impressed on the track section 4T so that the signal 4 will display a Y/Y aspect which in turn will cause a 180+ code to be impressed on the track section 3T to cause the signal 3 to display a G/G aspect. In this way, it is seen that following trains may be readily allowed to pass the distant approach signals with the proper signal indications. The home signal 5 can, of course, be left to clear behind the train as described or it can be manually controlled to stop by the restoration of the signal lever 5SL.

If the signal lever 5SL is left in a signal clearing position, then as the train passes into the track section beyond the track section 6T, and the signal 6 is allowed to indicate caution, the relay 6GYP is energized with a polarity to actuate its polar contact 145 to the left. This causes (B—) potential to be applied to the relay 5ADR and (B+) potential to be applied to the relay 5BDR so that the home signal 5 is caused to display a Y/Y/R aspect.

While the signal mechanism 5A is displaying yellow indication, the relay 5AYP is energized which prevents the signal mechanism 5B in a position to display a yellow indication from energizing the relay 5BGYP because of open back contact 173, but rather causes the energization of the relay 5AGP through a circuit closed from (+), and including front contact 171 of signal mechanism 5B, back contact 172 of signal mechanism 5B, front contact 173 of relay 5AYP, windings of relay 5AGP, to (—). The closure of front contact 38 of relay 5AYP causes a 180+ code to be applied to the track section 4T.

When the train proceeds far enough through the various track sections to allow the signal 6 to indicate proceed instead of caution, the relay 6GYP is energized with such polarity as to cause its polar contact 145 to be actuated to its right-hand position to apply (B+) potential to the relay 5ADR. This, of course, positions the polar contacts 155 and 156 to left-hand positions so that the home signal 5 is caused to display a G/G/R aspect.

In this way, the home signal 5 is caused to display indications in accordance with traffic conditions in advance subject to manual control.

Manual control of home signal with switch reverse

Assuming that the operator desires to send a train into the turnout with the switch W in a reverse position, he actuates the switch machine control lever SML to a reverse controlling position which in turn controls the relay WZ and the switch machine SM to operate the switch W to its reverse locked position. This is, of course, repeated by the relay WP and energizes the reverse correspondence relay RCR in the usual way. The operator then actuates the signal control lever 5SL to energize the relay 5GZ as above described.

The picking up of the relay 5GZ supplies energy to the route end relays 5RR and 8RR in series from (+), through a circuit including front contact 138 of relay 5GZ, windings of relay 5RR, front contact 168 of relay RCR, windings of relay 8RR, back contact 169 of relay 8GZ, to (—). This energization of the relays 5RR and 8RR in series makes it possible for the home signal 5 to be cleared subject to the entrance of a train into the interlocking approach control zone and prevents the clearing of the back-up signal 8 by reason of open back contact 170 of relay 8RR.

It might be noted here that the actuation of either the lever 7SL or 8SL will cause a similar operation to clear their signals 7 and 8 as described for the lever 5SL. The signals 7 and 8 are merely dwarf signals and are controlled by their respective signal levers directly so that they can be cleared at any time except when the home signal 5 is cleared. These signals 7 and 8 have associated therewith the stick locking route relay 7—8SR which is dropped away when either signal 7 or 8 is cleared and is again picked up only after a predetermined time as measured by the thermal relay 7—8TH following the restoration of such signals 7 and 8 to stop. The clearing of such signals causes the stick route locking to become effective in such a way as to prevent the application of driven code to the track section 4T thus causing the distant approach signal 4 to be held at stop. This is accomplished by providing energy for the code transmitting relays 4PCP and 4NCP through front contact 36 of the directional stick relay 5WS, which relay 5WS is deenergized whenever either signal 7 or signal 8 has been cleared and remains deenergized until the stick route locking has been released by the thermal relay 7—8TH.

It will, of course, be obvious that the removal of the normal driven code from the track section 4T causes the release of the relay 4HR and the application of the follow-up code in place of the inverse code to keep the highway crossing signals from operating. If there is no train approaching, then the follow-up code is of positive polarity and causes the operation of the track relay 4PAR which in turn causes the relay 4PAFP to be maintained energized for withholding the operation of the crossing signals, as above explained. On the other hand, if a train is approaching the signal 4 at stop, then the inverse code is absent in the section 3T deenergizing the relay 3AFPP so that the follow-up code in section 4T is negative. In this case, the track relay 4NAR is operated causing the energization of the relays 4NAFP and 4NAFBP, which, of course, maintains back contact 57 open and the crossing signals at rest.

To continue with the operation under consideration where the switch W is in a reverse position, it will be seen that the energization of the relays 5GZ and 5RR cannot effect the clearing of the home signal 5 until a train enters the interlocking approach control zone (of course, this operation is slightly different in the modified form of Fig. 3 later to be described).

Assuming that the train enters the interlocking approach control zone, then the relay 4PAFP is deenergized, as above described, closing back contacts 146 and 56 which allows the home signal 5 to be cleared. With the switch W in a reverse position, the circuit for the relay 5ADR is open so that this relay is deenergized preventing the clearing of the signal mechanism 5A, but the relay 5BDR is energized so that the signal mechanism 5B is caused to be actuated to display a green indication by reason of a circuit closed from (+), and including back contact 56 of relay 4PAFP, front contact 152 of relay 5RR, front contact 153 of relay 5GZ, back contact 161 of relay 5ADR, front contact 160 of relay 5BDR, operating winding of signal mechanism 5B, front contact 159 of relay 5BDR, back contact 158 of relay 5ADR, front contact 157 of relay 5GZ, to (—).

Thus, the home signal 5 is caused to display a R/Y/R aspect to advise an approaching train to proceed at medium speed preparing to stop at the next signal.

With the signal mechanism 5B actuated to a yellow displaying position, the relay 5BGYP is energized by reason of a circuit closed from (+), and including front contact 171 of signal mechanism 5B, back contact 172 of signal mechanism 5B, back contact 173 of relay 5AYP, back contact 164 of relay 5AGP, windings of relay 5BGYP, to (—).

The closing of front contact 174 of relay 5BGYP causes the negative code transmitting relay 4NCP to be operated at the 75 code rate by reason of a circuit closed from (+), and including front contact 36 of relay 5WS, oscillator contacts 75C, front contact 174 of relay 5BGYP, windings of relay 4NCP, to (—). This impresses a 75—driven code on the track section 4T which is received by the negative track relay 4NTR at the signal 4. The operation of the polar contact 175 of the track relay 4NTR causes the negative track repeating relay 4NTP to be intermittently energized at the 75 code rate so that it maintains its front contacts closed, because this relay 4NTP is so controlled as to be quick in picking up but slow in releasing as facilitated by the use of back contact 176 to shunt the resistor unit 177.

With the front contact 46 of relay 4NTP closed, then the polar contact 178 of the negative track relay 4NTR becomes effective to cause the track repeating relay 4TP to follow the negative driven code received by the track relay 4NTR, and thereby effect the picking up of the home relay 4HR. The relay 4ACP is caused to transmit an inverse code in the usual way as above described by inductive energization from transformer 201 which receives pulses of energy through front contact 46 and track relay contact 178 through the primary of the transformer 201.

The picking up of the home relay 4HR closes an energizing circuit for the signal mechanism 4A from (+), through a circuit including front contact 58 of relay 4HR, back contact 59 of relay 4VR, operating winding of signal mechanism 4A, back contact 60 of relay 4VR, front contact 61 of relay 4HR, to (—). This circuit causes the signal mechanism 4A to be operated to a position to display a yellow indication. This causes the energization of the relay 4AGYP as above described. Thus, a circuit is closed for the relay 4BDR from (+), and including front contact 179 of relay 4AGYP, front contact 180 of relay 4NTP, windings of relay 4BDR, to (—). The signal mechanism 4B is then energized by a circuit closed from (+), and including front contact 58 of relay 4HR, front contact 181 of relay 4BDR, back contact 182 of relay 4BHR, operating winding of signal mechanism 4B, front contact 183 of relay 4BHR, front contact 184 of relay 4BDR, front contact 61 of relay 4HR, to (—).

This causes the energization of the relay 4BGYP through a circuit closed from (+), and including front contact 185 of signal mechanism 4B, back contact 186 of signal mechanism 4B, back contact 187 of relay 4BHR, front contact 188 of relay 4BDR, windings of relay 4BGYP to (—).

It is obvious that the picked-up condition of the negative track repeating relay 4NTP releases its repeating relay 4NTPP by reason of open back contact 180. This repeating relay 4NTPP is very slow-acting so that it maintains its front contact 265 closed for a substantial period after its energizing circuit is opened to permit the negative transmitting relay 3NCP to apply a 120 (—) driven code to the track section 3T as soon as the relay 4NTP closes its front contact 67, in spite of the fact that the signal 4B has not yet assumed its clear displaying position to energize its repeating relay 4BGYP. In other words, an immediate shift in the polarity of the driven code for the track section 3T can be effected by reason of a temporary circuit including front contact 265, which temporary circuit is replaced by the regular control circuit including front contact 189 as soon as the signal 4B responds to the change in polarity of the driven code of the track section 4T. Thus, the release period of the relay 4NTPP is made sufficient to allow for the response of the signal 4B and the picking up of the relay 4BGYP. This temporary circuit including front contact 265 of relay 4NTPP is provided so that there will be no interruption in the transmission of driven code in the track section 3T, as such an interruption of the driven code might cause an undesired change in the signal indications being displayed at the signal 3, which might also be repeated to succeeding signals. In other words, this arrangement prevents any undesired control of the signals during the transitory conditions involved in shifting the polarity on the track sections 3T and 4T.

More specifically with relay 4BGYP picked up, a circuit is closed for energizing the negative code transmitting relay 3NCP to apply a 120— driven code on the track section 3T by reason of a circuit closed from (+) and including oscillator contact 120C, front contact 189 of relay 4BGYP, windings of relay 3NCP, front contact 67 of relay 4NTP, to (—). The operation of this relay 3NCP causes its polar contact 190 to impress a 120— code on the track section 3T by an obvious circuit.

This 120— code is received at the signal location 3 by the track relay 3NTR which operates its polar contact 191 to energize the repeating relay 3NTP, which is sufficiently slow acting to remain energized by the successive impulses of any negative code. With relay 3NTP picked up, the front contact 69 renders polar contact 192 of relay 3NTR effective to repeat the impulses of the code into the track repeating relay 3TP and to also cause the transmission of an inverse code depending upon whether or not an inverse code is being received in the adjoining section as repeated by the relay 2AFP.

The operation of the relay 3TP at the 120 rate causes the picked-up condition of the relay 3HR. Also, the 120 code rate is effective to pick up the relay 3BHR after the relay 3AGYP has picked up in response to the operation of the signal mechanism 3A to a yellow indicating position. This causes the signal mechanism 3B to also be actuated to a yellow indicating position in turn energizing the relay 3BGYP. When that occurs, the relay 3BDR is energized by reason of a circuit closed from (+) and including front contact 133 of relay 3NTP, front contact 193 of relay 3BGYP, windings of relay 3BDR, to (—). As soon as this relay 3BDR picks up, it is obvious that contact 76 and 77 pole change the polarity or direction of current flow in the operating winding of the signal mechanism 3A so that it is actuated to a green indicating position. Thus, the signal 3 is caused to display a G/Y aspect indicating to an approaching train that it must approach the second signal at medium speed.

It is obvious that the picked up condition of the relays 3HR and 3AGYP cause a 180 code to be impressed on the track section 2T. From the above description, it will be understood that the driven codes impressed on the track sections 3T and 4T are controlled so as to give proper approach indications for a medium speed route, and this control is accomplished as indicated in Fig. 5J by reason of changing the driven codes in the track sections 3T and 4T from positive to negative driven codes.

Without going into detail, it will be understood that an approaching train with the track switch W in reverse for a medium speed route, causes the approach locking to take effect in the same way as above described for the switch in the normal position. Also, the approaching control of the highway crossing signal is accomplished as above described in detail.

*Modification of Fig. 3*

We will now consider the form of the invention in which Fig. 3 is substituted for Fig. 1E. Insofar as the approach control is concerned, both for the approach route locking and the approach control of the highway crossing, the operation is exactly the same as described in connection with Fig. 1E and its associated figures. For this reason, the same reference characters have been applied to Fig. 3 except with respect to the different or added parts so that the previous description can be applied to this Fig. 3 the same as to Fig. 1E. However, this form of the invention disclosed in Fig. 3 provides that the operation of the signal lever 5SL to an operated position will cause the home signal 5 to immediately be operated to a clear signal displaying position dependent, of course, upon traffic conditions in advance, even though no train is in the approach control zone for the interlocking as required in connection with Fig. 1E. However, this immediate control to a clearing position of the home signal does not illuminate the signal nor does it permit a change in the code rates in the rear of such home signal until a train actually enters the interlocking approach control zone. In this way, the distant approach signals give the same indications as if the home signal 5 were at stop unless the approach control is effective to open contact 23 of relay 4PAFP and at the same time to close back contacts 194 and 195 to permit a driven code of an increased rate to be transmitted in the rear of the home signal 5. Thus, the same check on the responds of the approach control is provided in both forms of the invention.

More specifically, the energization of the relays 5GZ and 5RR by the operation of the signal lever 5SL provides that back contacts 196 and 197 of these relays respectively are opened which causes the approach locking stick relay 5ASR to be deenergized and also the directional stick relay 5ES. This in turn causes the deenergization of the lock relay LR and the closure of back contact 298 permitting the control of the signals 5 in accordance with traffic conditions. In other words, the contact 298 on the lock relay LR is substituted for the contact 56 of the relay 4PAFP of Fig. 1E.

The clearing of the signals, of course, causes the relays 5AGP, 5AYP and 5BGYP to assume proper positions in accordance with the indications given by the signal 5 and thus they are prepared to cause the proper code rate to be impressed upon the track section 4T when a train enters the approach control zone causing the relay 4PAFP to be deenergized and closed back contacts 194 and 195. But under normal conditions before the relay 4PAFP is deenergized, the only code that can be impressed upon the track section 4T is a 75+ code which is caused by the energization of the positive code transmitting relay 4PCP from (+) through a circuit including front contact 36 of relay 5WS, oscillator contacts 75C, front contact 195 of relay 4PAFP, windings of relay 4PCP, to (—).

When a train enters the interlocking approach control zone, back contacts 194 and 195 are closed so that the codes applied to the section 4T are the same as the above described for the passage of a train in connection with Fig. 1E, depending, of course, upon the indication given by the home signal 5. Also, the closure of back contact 146 approach lights signal 5 as previously explained.

The main advantage of this modified form of the invention as shown in Fig. 3 over the form shown in Fig. 1E is that the operator can check whether or not his route is established and whether the governing signal is properly operated to a clear signal displaying position before a train actually gets into the interlocking approach control zone. This check on the response of the signals can be accomplished by any suitable means, but in the usual type of centralized traffic control system of which the present invention is assumed to be a part, indicator lamps are provided on the control panel associated with the signal control levers and are distinctively controlled in accordance with the clear of stop position of the signals regardless of whether or not they are illuminated. Both forms are organized to provide the check on the effective operation of the approach control.

Broken down joint protection

It is contemplated that the track relay connections to the various track sections are so arranged as to provide the broken down joint protection inherent in the use of two-positioned biased to normal polarized track relays. This is particularly illustrated in Figs. 1A and 1B.

For example, it will be seen that the breaking down of the joints at the signal location 1 would permit the impulses applied to the track section T to also be applied to the track section 1T. But the current flow for the impulses applied to the track by the relay CP is in such a direction that it only causes the contacts of the track relay 1TR to be more firmly moved towards their biased positions. In such an organization, the breaking down of the joints is ineffective to operate the track relay and can in no way cause the clearing of the associated signal falsely. The only way that the signal 1 can be cleared is by receiving driven code pulses from the exit end of the associated track section 1T.

From the above description, it will be seen that the track section 1T, for example, has codes transmitted thereover which are always of the same polarity, but the track section 4T, for example, may have codes of either polarity depending upon traffic conditions. This means that there must be a positive and a negative track relay associated with the signal 4 in order to receive these codes of different polarities. Thus, any foreign current which may be applied to the track section 4T due to the broken down insulated joints at the signal location 4 will be received by one or the other of the track relays. It will, therefore, be appreciated that additional means must be provided at such a signal location to insure that a broken down joint at that signal location does not cause erroneous control of the associated signal to display to higher speed aspect than the traffic conditions might warrant. For this reason, special means is provided at signals 3 and 4 to give the desired broken down joint protection inasmuch as their respective track sections 3T and 4T have polarized codes applied thereto.

With reference to Fig. 5A, it will be seen that a 75+ code is normally impressed on the section 4T which causes the signal 4 to display Y/R; while the signal 4 in turn causes a 120+ code to be applied to the track section 3T. It would be most undesirable to have the 120+ code effect any operation which would cause the signal 4 to display a less restrictive aspect and fail to bring a train to stop short of the signal 5. This is because the signal 5 is a home signal governing traffic over one or more track switches forming an interlocking plant and no train should proceed past the signal 5 unless a route has been established and locked.

Although the insulated joints between adjoining track sections usually break down or fail during the passage of a train or shortly thereafter, it may happen that conditions are such that the insulated joints at signal 4 fail while a normal 75+ code is applied to the track section 4T by the transmitting relay 4PCP at the right-hand end of such track section. Under such circumstances, the positive impulses of the 120+ code applied to the track section 3T would also flow into the track rails of the track section 4T with such a direction of current flow as to be repeated by the negative track relay 4NTR. The first erroneous impulse repeated by the negative track relay 4NTR causes the negative repeater relay 4NTP to pick up and open its back contact 67 preventing any further application of impulse energy to the track section 3T by the positive code transmitting relay 3PCP. But, the relay 4NTP remains picked up for a substantial period of time even though the contact 175 of the relay 4NTR immediately assumes its biased position. Although the relay 4NTR may not drop away before the relay 4NTP closes its front contact 46 and thereby allows a very momentary energization of the repeating relay 4TP, such momentary energization is of such short duration that even if it can be repeated by the relay 4TP, it is ineffective to delay the release of the relay 4HR for any substantial time.

With the relay 4NTP picked up, it is seen that the track relay 4NTR will not be operated with erroneous code impulses and the operation of track relay 4PTR by any legitimate code impulses cannot be repeated into the relay 4TR. Thus, the relay 4HR drops away before the relay 4NTP drops away, because the release period of relay 4NTP is substantially longer than the release period of relay 4HR. In other words, there are no code impulses repeated by the relay 4TP until after the relay 4NTP has dropped away under the circumstances assumed.

When the release period of the relay 4NTP has elapsed, it again closes back contact 67 which permits one impulse of a 75+ code to be applied to the track section 3T because the relay 4HR is now deenergized closing back contact 66. This impulse would then operate the track relay 4NTR in turn immediately picking up the relay 4NTP, thereby preventing the further application of impulse energy to the track section 3T as above described. Inasmuch as a momentary energization of the relay 4TP which might occur during a transitory correspondence between contacts 178 and 46 of relays 4TP and 4NTP respectively would be of such brief duration as to be ineffective to cause the pick up of the relay 4HR, and since the opening of back contact 46 prevents the repeating of any legitimate impulses in the track section 4T into the track repeating relay 4TP, the relay 4HR remains deenergized. In this way, it will be seen that the relay 4NTP is caused to be alternately energized and deenergized, its picked-up periods being substantially longer than its dropped-away periods, and in so doing prevents the relay 4HR from receiving sufficient energy to cause it to pick up.

The above operation assumes that the 75+ code applied to the section 3T when the relay 4HR drops away is out of synchronism, so to speak, with the 75+ code on the track section 4T. In other words, the "on" periods of one code occurs during the "off" periods of the other code. This means that during the dropped-away condition of the relay 4NTP, that the relay 4PTR may be energized from the legitimate 75+ code on the track section 4T. This will be repeated into the relay 4TP, but the relay 4NTP is immediately picked up by the following energization of the relay 4NTR by the erroneous 75 code from the track section 3T, so that the relay 4TP receives an energization only once for each deenergization of the relay 4NTP. These energizations are sufficiently far apart so that the relay 4HR is not picked up under usual circumstances. Even if it did pick up it would only be a momentary operation of the contacts which would be of insufficient duration to the response of the signal mechanism 4A. It may be noted here that the initial release of the relay 4HR during the first picked-up condition of the relay 4NTP will cause the signal mechanism 4A to assume its deenergized condition to display a red aspect and in so doing causes the relay 4AGYP to be released. Thus, with contact 179 open, the periodic operation of the relay 4NTP under such broken down joint conditions as assumed, prevents the energization of the relay 4BDR.

On the other hand, it might happen that the 75+ code applied to the section 3T would be in exact synchronism, so to speak, with the 75+ code applied to the track section 4T. In such an event the currents through the track relays 4PTR and 4NTR would undoubtedly cancel each code so as to cause no relay response. Such non-operation of the track relays 4PTR and 4NTR would obviously cause the release of relay 4HR and would continue to cause the deenergized condition of the relay 4HR without a pumping action of the relay 4NTP.

With reference to Fig. 1C, it will be seen that the track section 3T must have code applied to it by the relay 3PCP if the track section 4T is receiving positive code impulses, while the track section 3T must have impulses applied by the relay 3NCP if the track section 4T is receiving negative code pulses. Thus, if the track section 4T is receiving negative code pulses under conditions illustrated in Fig. 5J, then the relay 4NTP would be steadily maintained energized and the track section 3T would have a 120— code applied to it, as above described. Should the insulated joints at the signal 4 location break down under such circumstances due to one cause or another, the impulses from the track section 3T would flow into the rails of track section 4T in such a direction as to be repeated by the relay 4PTR. However, due to the difference in the code rates, the track relay 4NTR would receive a sufficient number of legitimate code pulses of the 75— code applied to its track section, that the relay 4NTP would remain picked up. Thus, any erroneous impulses repeated by the track relay 4PTR would be ineffective to cause any operation of the relay 4TP because of open back contact 46, so that the signal 4 would continue to display the same aspect of Y/G regardless of the broken-down joint condition.

However, it should be noted that in any circumstances explained above, the approach of a train on the track section 3T would be effective to shunt the impulses applied to that track and also shunt the track relays 4PTR and 4NTR if the intervening joints are broken down. In other words, to the extent that the joints are broken down to allow energy for the operation of the track relays in advance of the signal 4, to the same extent an approaching train is effective to shunt such track relays and thereby cause them to cease operation. This causes the signal 4 to be placed at stop in the face of the train thereby providing a further check upon the condition of the insulated joints.

As mentioned above, the breaking down of insulated joints usually occurs during the passage of a train or immediately thereafter, and it may happen that as the train proceeds through the track section and nearly reaches the exit end that sufficient energy will flow past the insulated joints to cause the operation of the track relays in advance of the signal 4. Obviously, under such conditions and also when there is a broken rail in track section 4T, the track relays 4PTR and 4NTR would not receive legitimate code impulses. The erroneous impulses received by these track relays would be of such a direction as to cause the operation of the negative track relay 4NTR which is in turn repeated by the relay 4NTP as above explained. The opening of back contact 67, of course, removes the energy from the relay 3PCP and prevents further code impulse energy from being applied to the track section 3T until after the relay 4NTP has again dropped away. Thus, under these circumstances, the relay 4NTP operates to pick up and drop away periodically while such conditions exist with the relay 4NTP being picked up for longer periods then it is dropped away. This causes the signal 4 to remain at stop for the same reasons described, the only difference being that the relay 4PTR cannot possibly be operated by a legitimate code pulse while the relay 4NTP is dropped away during its pumping operation.

In any of the cases described above, the release of the relay 4HR causes the signal mechanisms 4A and 4B to be operated to their positions for displaying a R/R aspect which, of course, causes the relays 4AGYP and 4BGYP to be deenergized. The opening of front contact 179 of the relay 4AGYP causes the deenergization of the relay 4NTPP in addition to its deenergization by the picking up of the relay 4NTP and opening of its back contact 180. The opening of front contact 265 of this relay 4NTPP prevents the application of the 120— code to the track section 3T during the periods in which the relay 4NTP is picked up. Thus, the signal 3 is held to stop under such conditions as described above. This causes the subsequent signals to display indications in accordance therewith in such a manner that an approaching train is brought to stop under safe conditions in spite of broken down joints at the signal 4 location.

With reference to Fig. 1C, it will be seen that the negative track repeating relay 3NTP is operated by contact 191 of the negative track relay 3NTR in the same manner as explained for the relay 4NTP, but the manner in which this relay 3NTP is associated with the apparatus at this signal 3 location to accomplish the broken down joint protective features is slightly different than explained for the relay 4NTP of Fig. 1D.

For example, under normal conditions there is a 120+ code in the track section 3T which is maintaining the relays 3HR and 3BHR energized as previously described, which causes a 180 code to be impressed on the track section 2T by the transmitting relay 2CP. If the insulated joints at the signal 3 location should become broken down under such circumstances, the code from the track section 2T would also be applied to the track section 3T and act on the relay 3NTR to pick up the relay 3NTP. The opening of back contact 69 of relay 3NTP would prevent the reception of any legitimate code impulses by the relay 3PTR from being able to act on the relay 3TP, while the closure of front contact 69 would permit the 180 code of the track section 2T as received by the relay 3NTR to be repeated into the relay 3TP. However, the picking up of the relay 3NTP opens its back contact 230 which thereby prevents the energization of the relay 3DR even though code pulses are repeated by the relay 3TP at substantially a 180 code rate.

Furthermore, the erroneous impulses repeated by the relay 3TP would not be of the 120 code rate so that the relay 3BHR would drop away causing the signal mechanism 3B to display a red aspect. This would cause the deenergization of the relay 3BGYP opening its front contact 88 and closing its back contact 88. In this way, the 180 code is removed from the track section 2T and the 120 code cannot be applied because of open back contact 133 of relay 3NTP. This cessation of the reception of erroneous code impulses causes the relay 3NTP to drop away after a time period which is sufficient for the relay 3HR to be released, and this dropping of relay 3HR causes the signal mechanisms 3A and 3B to assume red displaying positions. When back contact 133 is closed and impulse energy is applied to the track section 2T, it is immediately repeated by the relays 3NTR and 3NTP so as to prevent a second impulse from being applied. From here on the operation is very similar to that explained in connection with the relay 4NTP of Fig. 1D, inasmuch as this relay 3NTP continues to be alternately energized and deenergized at such a rate and in such a manner that the relays 3HR, 3BHR and 3DR remain deenergized for reasons explained in connection with Fig. 1D.

Under those conditions in which the track relay 3PTR fails to receive any code pulses because of a broken rail in track section 3T, or the presence of a train therein near the exit end of the section, the breaking down of the joints at the signal 3 location allows impulses from the track section 2T to cause the operation of the relay 3NTR. In such a case, the relays 3HR, 3BHR and 3DR are all deenergized so that such erroneous impulses would be at the 75 code rate. But the first erroneous impulse is received by the relay 3NTR and repeated by the relay 3NTP opening back contact 133 so that a second impulse is not applied until after the release period of the relay 3NTP has elapsed. Thus, the relay 3NTP oscillates up and down in a manner to be picked up for longer periods than it is dropped away. This periodic operation of the relay 3NTR is not sufficiently rapid to be effective to pick up the relay 3HR even though there may be a transitory condition of correspondence between the contacts 192 and 69 for reasons pointed out in connection with Fig. 1D.

With the signal 3 held at stop under the conditions explained, it is obvious that a train will approach on restricted indications and stop short of the signal 3, it being again noted that the shunting of the track section 2T by a train is effective to shunt the track relays 3PTR and 3NTR to the same extent that the insulated joints at the signal 3 are broken down to permit energizing current to flow into the track section 3T.

In this way, the present invention provides broken down joint protection for both the automatic territory and also for the approach zone of an interlocking plant in which polarized driven and inverse codes are employed.

*Apparatus organization of Figs. 2A–2D*

In Figs. 2A, 2B, 2C and 2D a portion of railroad is shown where two parallel tracks provide for the movement of traffic in the same direction. Although these tracks have not been shown as connected to the track of Figs. 1A to 1E, it is to be understood that they may be a portion of the same railroad.

It is with this understanding that only the transmitting and receiving apparatus directly associated with these tracks have been shown in detail, because the various code responsive devices are assumed to be the same as shown in Fig. 1A, for example. Also, the indications of the signals are governed in accordance with signal control means shown in Fig. 1A, and the various aspects displayed by the signals are in accordance with the automatic block signal indications shown in the chart of signal indications or aspects given above.

In Fig. 2C, a highway crossing is shown closely associated with the automatic signal 23 so that the approach control zone for this highway crossing extends one block in the rear of such automatic signal. The flashing light signals $X^1$ and $X^2$ associated with the crossing are indicated as controlled by relays 23AFBP and 33AFBP, it being understood that any suitable crossing signal may be used and this control is merely indicated to show that these signals are set into operation when either or both of these relays are deenergized.

Normal conditions

Figure 6:
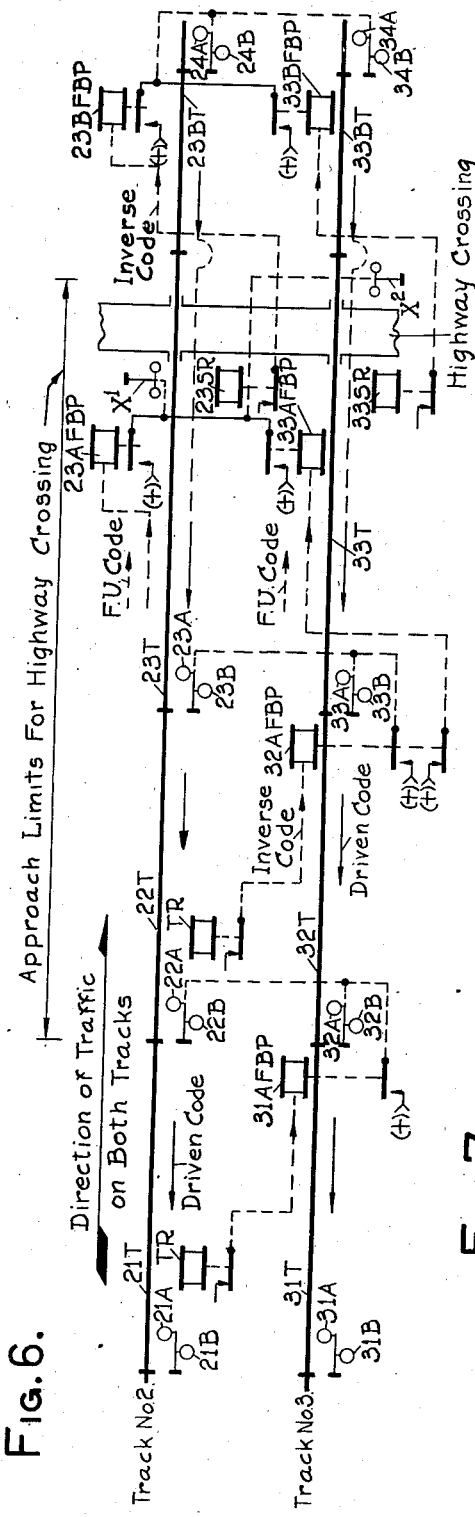
Fig. 6 is a diagrammatic chart of the operation of the coded track circuit signaling system of Figs. 2A to 2D.

Instead of showing train movement charts for Figs. 2A-2D, a functional or operational diagram has been shown in Fig. 6 to more clearly bring out the relationships between the apparatus for the two tracks as provided in accordance with the present invention. In this functional diagram of Fig. 6, driven codes are indicated by arrows with solid line shafts while inverse codes are indicated by arrows with dotted line shafts. Also, certain of the controls governing the codes have been indicated by dotted lines with respect to certain relays. A so-called "follow-up code" has been indicated in this Fig. 6 by an arrow with a dotted line shaft having the legend "F. U. code," which code is not normally present while a driven code is on the associated track section, but is applied under conditions which will be explained in detail hereinafter. Further explanation of this functional diagram of Fig. 6 will be made as the description progresses.

With reference to Figs. 6 and 2A-2D, it will be seen that driven codes are transmitted in the section 23BT and in the section 33BT toward the highway crossing, which driven codes are repeated directly from the respective track relays 23BTR and 33BTR into the adjoining sections 23T and 33T. The driven codes applied to the track sections 23BT and 33BT by their respective code transmitting relays 23BCP and 33BCP are selected in accordance with traffic conditions in advance in automatic block territory, and these code transmitting relays may be respectively controlled by conditions in the track sections 24T and 34T in a manner similar to that shown in Fig. 1A.

On the track No. 2, the driven code received over track section 23T at the signal 23 causes the control apparatus to assume conditions as shown for example in Fig. 1A for the signal 1, because the apparatus associated with signal 23 is similar to that provided for signal 1 and gives the same indications in response to a driven code of any particular rate as selected in accordance with traffic conditions in advance. On track No. 3, similar conditions exist, namely, the driven code in section 33T is in accordance with traffic conditions and similarly controls the signal 33.

The track section 22T in the rear of signal 23 has a driven code applied thereto of a rate in accordance with the aspect displayed by the signal 23, such control of the code rate having been shown in detail in connection with signal 1, for example, of Fig. 1A. Similarly, the track section 32T has a driven code applied thereto in accordance with the aspect displayed by the signal 33. Each of the track sections in the rear of signals 22 and 32 may be considered as duplicates of these track sections 22T and 32T respectively, as the automatic territory may extend over a substantial distance. It should be understood, however, that the track thus shown in Figs. 2A-2D may be connected to interlocking plants as shown in Figs. 1A-1E, may have highway crossings, outlying track switches, or other situations that are present in practice without in any way affecting the application of the present invention.

On the track No. 3, it will be seen that each track section of this automatic block type has an inverse code associated with it (see Fig. 6) which originates at the entrance end of its section but which is controlled by traffic conditions on the associated section of track No. 2 as well as by traffic on its own track so that when there is a train on either track, the inverse code is removed from the corresponding section of track No. 3, to effect the approach lighting of the signals for both tracks. Thus, the track No. 2 in the regular automatic block territory is not provided with inverse codes in its various sections. Referring to Figs. 2A and 6, it will be seen that the approach relay 31AFBP, for example, provides that both of the signals 22 and 32 are illuminated when it is deenergized, and this relay is controlled in accordance with the inverse code in the track section 31T. The same is true with respect to the track section 32T.

However, the section of track No. 2 crossed by the highway in Fig. 2C is provided with inverse codes as well as the corresponding section on track No. 3. The track sections 23T and 23BT on opposite sides of the highway crossing are provided with independent inverse codes, the inverse code for the section 23T originating at the signal 23, while the inverse code for the section 23BT is controlled in accordance with the shunt relay 23SR. When a train enters the track section 23T, this relay 23SR is shunted and ceases its operation which causes its repeater relay to drop away interrupting the inverse code in the section 23BT.

On the track No. 3, the inverse code in the track section 33T is controlled by the approach relay 32AFBP in such a way that when a train passes the signal 32 or the signal 22, the inverse code in the track section 33T is interrupted. This causes the highway crossing signals to be set into operation regardless of which track is occupied by a train approaching the crossing. The interruption of the inverse code in the section 33T does not interrupt the inverse code in the section 33BT. But when a train enters or passes the signal 33 and causes the shunt relay 33SR to stop its operation, the relay 33SRP is released and interrupts the inverse code in the section 33BT.

The shunt relays 23SR and 33SR are similar in construction to the track relays TR and AR. In other words, these relays are of the two-positioned polarized type with their contacts biased to one of their positions. Each relay is connected in multiple across its respective track section so as to be energized by both the driven and inverse codes in that track section. In other words, these relays have their contacts operated by both the driven and inverse codes and are provided with repeating relays 23SRP and 33SRP which are maintained picked up so long as these shunt relays remain in operation.

Although the present disclosure shows the driven and inverse codes to be of the same polarity under normal conditions, it is to be understood that the inverse codes may be of the opposite polarity, in which case the shunt relays SR would be so connected as to follow the driven codes and be unresponsive to the inverse codes. In either case, the entrance of a train into a track section causes a shunting of the source supplying the code impulse energy to that section and thereby effects a sufficient potential drop in the limiting resistor associated with the source of energy so that the associated shunt relay ceases to follow the driven code applied by the associated code transmitting means and its repeating relay SRP is dropped away.

It will be observed that shunt relays 23SR and 33SR are associated only with the highway crossing shown in Fig. 2C but it is to be understood that such relays might well be employed in other portions of a coded track circuit signaling system if desired. It is also to be understood that these relays need be used as shown only as required by the circumstances of practice, there being occasions in which such relays may be omitted and still provide highway crossing control as will be discussed later in connection with Fig. 7.

At the signal locations 23 and 33 means is associated with the code receiving and transmitting apparatus which effects the application of a follow-up code (designated "F. U. code" in Fig. 6) to their respective sections after a train has passed for the purpose of stopping the highway crossing signal operation as soon as the train passes the insulated joints at the crossing location. This will be explained in detail as the description progresses.

In view of the detailed description of the operation of the apparatus with respect to Figs. 1A and 1B, for example, it is believed to be unnecessary to point out in detail the operation of the signals and associated apparatus in this portion of the disclosure except with regard to those features which are distinctive to approach lighting and highway crossing control, especially since Fig. 6 diagrammatically illustrates the various conditions of driven and inverse codes normally present in the system and indicates their interrelated functions.

*Passage of train over track No. 3*

The presence of a train on the track section 31T, of course, prevents the approach relay 31AR from receiving inverse code pulses. This means that the repeater relays 31AFP and 31AFBP are both deenergized. The closing of the back contacts of the relay 31AFBP causes both the signals 22 and 32 to be approach lighted as indicated by legend in Fig. 2A and shown in a typical manner in Fig. 1A.

Now assume that the train passes into the track section 32T and shunts the approach relay 32AR to prevent it from receiving inverse code pulses so that its repeater relays 32AFP and 32AFBP are both deenergized. The deenergization of the relay 32AFBP causes both of the signals 23 and 33 to be approach lighted. Also, the opening of front contact 231 of relay 32AFBP causes the interruption of the inverse code in the track section 33T which deenergizes the approach relay 33AR resulting in the release of its repeater relays 33AFP and 33AFBP.

The closure of back contact 232 of relay 33AFBP causes the highway crossing signals to be operated to thereby warn any approaching highway traffic of the oncoming train. It will be noted that as the train completely passes into the track section 32T and out of the track section 31T that a 75 driven code is placed on the track in the rear of the train in a manner explained in detail for Fig. 1 and, of course, the various sections in the rear increase their code rates so as to provide the indications of the automatic block signaling territory as explained in detail in connection with Fig. 1. Thus, these details will not be considered with respect to the operation of Fig. 2.

As the train proceeds from the track section 32T entirely into the track section 33T, the approach relay 32AR is allowed to receive an inverse code so that the relay 33AFBP is energized to close the front contact 231. But the train in the track section 33T shunts the track relay 33TR so that it is not in operation and the closure of front contact 231 cannot in any way cause the transmission of an inverse code, but it does prepare the circuit for the transmission of the follow-up code to stop the operation of the highway crossing signals as soon as the train passes such highway crossing. Even if such follow-up code is impressed on the rails with the train in section 33T, it cannot be effective on the approach relay 33AR until the train entirely passes into the section 33BT. When the train is entirely in the track section 33BT, the follow-up code can readily act upon the relay 33AR because there can be no driven code applied to the track section 33T inasmuch as the track relay 33BTR is shunted by the train so that its contact 233 remains in its normal biased position. This follow-up code has been designated in the diagrammatic showing of Fig. 6 as an arrow with a dotted line shaft bearing the legend "F. U. code."

More specifically, with the train in the track section 33BT, no driven code is being received by the track relay 33TR so that the relays 33TFP, 33TFBP and 33TP are all deenergized. This closes a circuit for the approach transmitting relay 33ACP from (+), through a circuit including oscillator contacts 75C, back contact 234 of relay 33TFP, back contact 235 of relay 33TFBP, polar contact 236 of relay 33TP, front contact 231 of relay 32AFBP, windings of relay 33ACP, to (−).

This 75 follow-up code applied to the section 33T is received by the approach relay 33AR which operates to pick up its relays 33AFP and 33AFBP in the sequence named thus opening back contact 232 and removing the highway crossing signal from operation.

Having considered the control of the highway crossing, it should be noted that when the train entered the track section 33T before proceeding into the track section 33BT, it not only shunted the approach relay 33AR but also shunted the relay 33SR which relay normally follows the driven code applied to the track section 33T as repeated from the relay 33BTR. However, the shunting of the track rails of the track section 33T as soon as the train enters causes this shunt relay 33SR to cease its operation so that its polar contact 237 remains in its biased position. This permits the slow-acting repeater relay 33SRP to drop away opening front contact 238 to prevent the application of an inverse code to the track section 33BT which, of course, causes the approach relay 33BAR to cease operation. This causes the repeater relays 33BFP and 33BFBP to drop away closing back contact 239 to approach light both signals 24 and 34.

In this way, it is seen that the highway crossing control begins at the entrance to track section 32T by reason of dependence of the inverse code in track section 33T upon the inverse code in the track section 32T. But the approach lighting for the signals 24 and 34 is not effected until the train passes the signal 33 at which time the shunt relay 33SR is deenergized to interrupt the inverse code in the section 33BT and thus cause the signals to be approach lighted.

When the train leaves the section 33BT having fully entered the track section 34T, it is obvious that a driven code will be applied to the track section 33BT by the transmitter relay 33BCP. This code will be of a 75 code rate and will be repeated into the track section 33T by the track relay 33BTR. But at this particular time, the follow-up code is still in the track section 33T so that the two codes are opposing each other. However, due to the natural laws of probability and chance these two codes will not exactly oppose one another or if they do, such exact opposition will not last for any substantial time so that the track relay 33TR will be energized at least momentarily between certain of the follow-up code pulses. Such operation of the track relay 33TR will, of course, be repeated by its front repeater 33TFP immediately opening back contact 234 to remove the follow-up code. This cessation of the follow-up code allows an unhindered driven code to be received by the track relay 33TR and allow its front-back repeater relays and relay 33HR to be picked up in the usual way. The closure of front contact 235 acts to immediately cause an inverse code to be transmitted in the track section 33T to maintain the relay 33AFBP energized so that the crossing signal is at rest dependent upon the approach of following trains.

*Passage of a train on track No. 2*

As above explained, the signals on track 2 are normally displaying proceed aspects and are controlled exactly the same as described in detail in connection with Fig. 1. Thus, a train approaching the signal 22 on track section 21T receives a proceed indication from the aspect of G/G. This signal 22 is approach lighted because of the deenergized condition of the relay 31AFBP due to the interruption of the inverse code in the track section 31T in exactly the same manner that a train on track section 22T interrupts the inverse code in the track section 32T, presently to be explained.

Assuming that the train passes the signal 22 and enters the track section 22T, the driven code being received by the track relay 22TR is, of course, shunted so that the track front and back repeaters 22TFP and 22TFBP are dropped away opening front contacts 240 and 241 respectively. This prevents the inverse code transmitter relay 32ACP from transmitting an inverse code in the track section 32T as these contacts 240 and 241 are in the inverse code transmitting circuit. The interruption of the inverse code in the track section 32T, of course, causes both of the signals 23 and 33 to be approach lighted by reason of the deenergization of the relay 32AFBP and closure of back contact 247. This deenergization of relay 32AFBP also causes the interruption of the inverse code in the track section 33T by reason of the opening of front contact 231. Thus, as soon as the train enters the track section 22T, the crossing signals are set into operation by reason of the control of the inverse codes in the track sections 32T and 33T.

When the train proceeds into the track section 23T, the inverse code is immediately shunted so that the relay 23AFBP is released to continue the operation of the crossing signals by reason of the closure of back contact 244. This entrance of the train, of course, shunts the track relay 23TR and causes the release of the relays 23TFP and 23TFBP closing back contacts 242 and 243 to permit a follow-up code to be placed across the section 23T behind the train as it proceeds through the section, so that when the train has entirely entered the track section 23BT, the follow-up code can then act on the approach relay 23AR and cause the picking up of the relays 23AFP and 23AFBP to stop the operation of the crossing signal.

It is noted that the dropping of the track repeating relay 23TFBP does not in any way interrupt the inverse code in the track section 33T. This is unnecessary inasmuch as the shunting of the inverse code in the track section 23T causes the crossing signal to remain in operation.

Thus, when the train is wholly in the track section 23T, the inverse codes can be reestablished in the track sections 32T and 33T in the usual way. The entrance and presence of the train in the track section 23T, of course, causes its shunt relay 23SR to remain deenergized so that its polar contact 245 remains in its biased position thus allowing the normally picked up repeater relay 23SRP to drop away. This opens front contact 246 interrupting the inverse code transmission in the track section 23BT so that the approach relay 23BAR remains deenergized allowing its front-back repeaters 23BFP and 23BFBP to drop away. The closure of back contact 347 causes both of the back signals 23 and 24 to be approach lighted. As the train wholly enters the track section 23BT, the follow-up code in the track section 23T, of course, causes the energization of the relay 23AR and its front-back repeaters act to remove the crossing signal from operation. This continues until the train wholly leaves the track section 23BT into the track section 24T at which time a driven code is placed in the track section 23BT (of a 75 code rate as described in connection with Fig. 1) which is repeated into the track section 23T by the track relay 23BTR. This driven code then opposes the follow-up code in the same way as explained in connection with track section 33T and causes the track relay 23TR to pick up its repeater relay 23TFP and open back contact 242 to prevent the application of the follow-up code. The system is thus restored to normal in readiness for further train movements.

Although the description has considered trains separately on the two tracks, it is to be understood that they may move at any time on either track with any particular relationship as to speed and time, and still cause the approach control of the highway crossing signals and the approach lighting of the various automatic signals.

With reference to Fig. 6 (or Figs. 2A-2D), it will be seen that the inverse code for section 23BT is interrupted as soon as a train passes the signal 23. Similarly, the inverse code in the section 33BT is interrupted as soon as a train passes the signal 33. In other words, the inverse code which arrives at the signals 24 and 34 for their respective tracks Nos. 2 and 3, are independent of one another but the interruption of either causes the signals 24 and 34 to be approach lighted. For this reason this organization of highway crossing control is adapted to permit its use in approach to an interlocking plant. That is, the track sections 23T and 23BT of track No. 2 could readily be substituted for the track section IT of Figs. 1A and 1B.

It may happen, however, that it is entirely unnecessary to provide highway crossing control thus adaptable to approach control for an interlocking plant, and under such circumstances, it is possible to omit the inverse code in the track section 23BT. This has been indicated in Fig. 7 which is an operational diagram similar to Fig. 6.

It may also happen that the highway is so located that it is unnecessary to set the highway crossing signals X¹ and X² into operation before the train reaches the signals 23 and 33. In such cases it is unnecessary that the inverse code in track section 33T be dependent upon the inverse code in section 32T as shown in Figs. 2 and 6. This situation permits the elimination of the shunt relays SR inasmuch as the entrance of a train into either the track section 23T or 33T acts at that time to interrupt the inverse code of its respective section which can be repeated into the section 33BT for controlling the signals 24 and 34 to approach light them. All of this has been indicated in Fig. 7, and it is believed that it will be readily understood how the apparatus of Fig. 2 may be modified to accomplish the purposes indicated in this diagrammatic illustration of Fig. 7.

Figure 7:
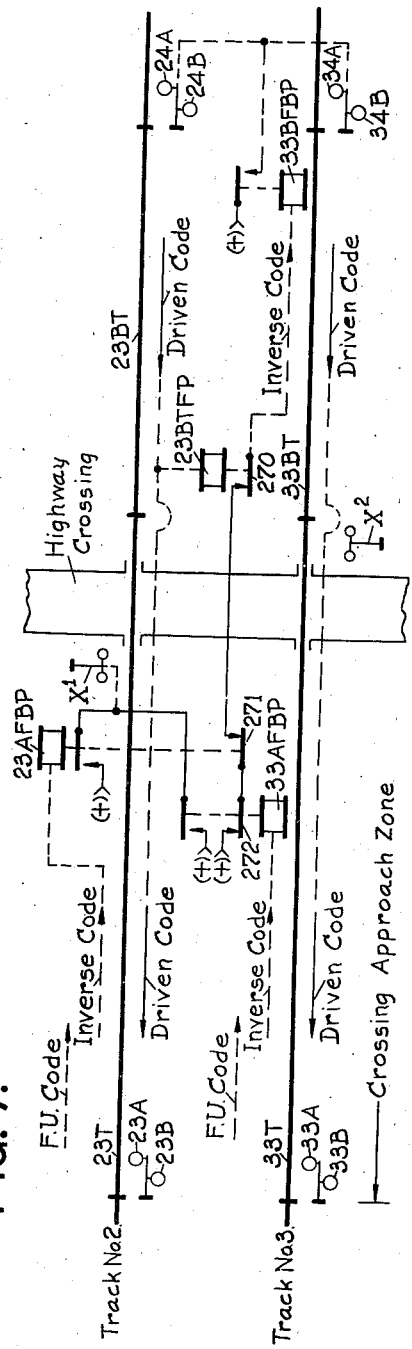
Fig. 7 is an operational chart of a modified form of Figs. 2A-2D.

With reference to Fig. 7, it will be seen that there is an inverse code in the sections 23T and 33T in the same manner as explained above in connection with Fig. 2. Also, each of these sections has the same follow-up code as above explained in connection with Fig. 6. The thing to note in connection with this Fig. 7 is that the inverse code of the section 33BT is controlled through a front contact 270 of relay 23BTFP, which is dependent upon the operation of the track relay of the track section 23BT. This inverse code is also dependent upon front contact 271 of relay 23AFBP which is, of course, dependent upon the reception of an inverse code in the track section 23T. In addition to this control, the inverse code of section 33BT is also controlled through front contact 272 of relay 33AFBP. These contacts 271 and 282 take the place of the shunt relay control provided in Fig. 2C and can be thus used in situations where the highway crossing approach zone originates at the first signal in the rear of the highway. Also, the contact 270 takes the place of the inverse code in the track section 23BT. This can be done inasmuch as the successive track sections may be of the automatic block type and it is unnecessary to have a relay such as 23BFBP of Fig. 2D that may be used to control an inverse code in the subsequent track section as has been shown in an approach to an interlocking in Fig. 1B.

It is believed that the various situations for highway crossing control have been adequately disclosed so that it will be understood how highway crossing control may be adapted to various situations found in practice in a coded track circuit signaling system of the type disclosed herein. In Fig. 6 the highway crossing is assumed to be close to the entrance end of the block while in Fig. 7 the highway crossing is assumed to be an adequate distance from the entrance to the block to provide a proper highway crossing approach control zone. In Fig. 1E, the highway crossing is assumed to be near the exit end of the block.

*Track circuit characteristics*

Figure 4:
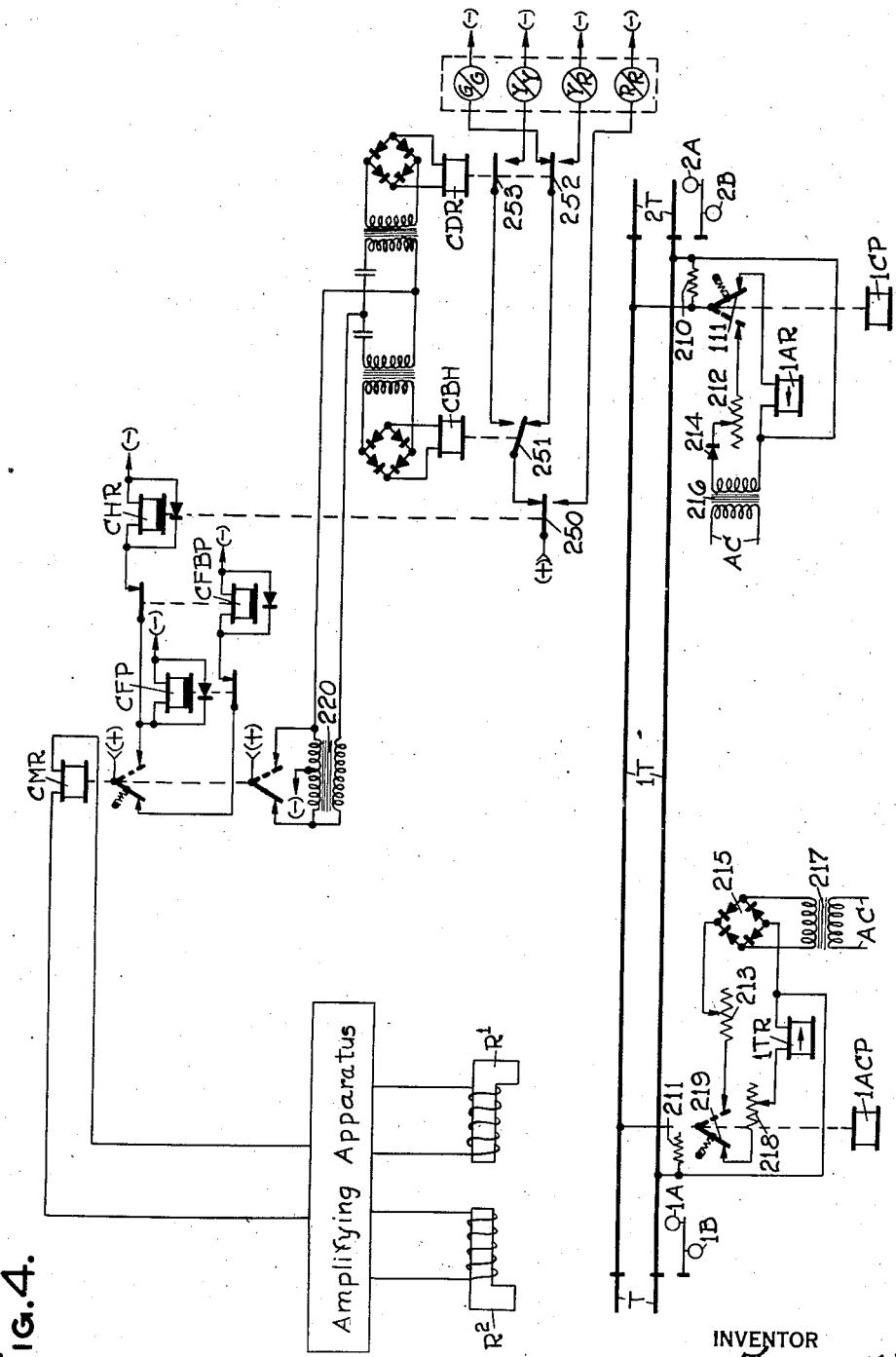

With reference to Fig. 4 of the accompanying drawings, a typical track section 1T has been reproduced from Figs. 1A and 1B together with the apparatus immediately associated with the track section. This typical track section 1T has also shown as associated therewith a diagrammatic illustration of a cab signaling apparatus which may be employed in connection with the coded track circuit system of the present invention. But before considering the operation of a typical cab signaling apparatus, it is desired to discuss the characteristics of the coded track circuit as provided in accordance with the present invention.

It will be seen that the control of the code transmitting relay ICP periodically operates its contact 111 to an operated position to apply impulses of current through a variable resistor 212, and a half-wave rectifier 214 from the secondary winding of a transformer 216 to the track rails of section 1T. These impulses of current are made up of a plurality of half-waves of alternating current which are received at the other end of the track circuit by the direct current track relay 1TR through a variable resistor 218 while the inverse code transmitter 1ACP is deenergized closing its back contact 219.

At the track relay end of the track circuit, the transmission of inverse code is effected by the relay 1ACP when its polar contact 219 is actuated to a right-hand position, in which it applies impulses through a variable resistor 213 and a full rectifier 215 from the secondary of the transformer 217 to the track rails of section 1T. These inverse code impulses intersperse the driven code impulses and are received by the direct current approach relay 1AR while the polar contact 111 of the relay 1CP is in its deenergized position.

A bleeder resistance 211 is connected across the track rails at the relay end of the circuit, and similarly a bleeder resistance 210 is connected across the track rails at the transmitting end of the track circuit.

The regular driven codes comprise impulses of the different rates as above described, with each impulse being made up of a plurality of half-waves of alternating current. It is seen that the peak voltage applied across the track rails is then higher than would be the voltage if direct current were used with a given value of average current flow through the track relay 1TR. This higher peak voltage makes it easier for the train shunt to become effective in shunting the track rails to cause the relay 1TR to remain deenergized because these higher peak voltages tend to more readily break down the film of oxidation that may have formed on the track rails before the train entered the track section.

This same theory of operation is, of course, applicable to the inverse code pulses which are transmitted from the left-hand end of the track section by the relay 1ACP to the approach track relay 1AR. But these impulses are provided from a full-wave rectifier so that the individual waves of each code impulse are closer together and provide a greater energy transfer during a given time for the same peak voltage consistent with the proper operation of the relay 1AR. Full wave rectification by reason of the bridge connected rectifier units 215 is provided because the length of an inverse code impulse is somewhat shorter than the length of a driven code impulse, and it is necessary to have substantially the same total amount of energy transmitted through the rails to the relay 1AR in such shorter impulse period as is transmitted for the track relay 1TR during the driven code impulse period.

The bleeder resistances 210 and 211 are connected across the track rails so that the variation in ballast resistance for different weather conditions will have less effect upon the current flow through the track relay. This feature together with the effect of the rectifier units in combination with proper resistance track relays and the electrolytic and storage battery effect of the trackway for all practical purposes compensates for the various changes in ballast resistance under different weather conditions.

With this organization where the average current in the track relay ITR for each of the code impulses is substantially the same regardless of variations in ballast conditions, it is possible for the time of operation of the track relay to remain substantially constant in following the driven code pulses as applied to the track rails by the code transmitter ICP even under varying ballast conditions.

Another advantage of using the alternating current supply through the rectifier unit 214, for example, is that each of the code impulses regardless of its rate comprises a plurality of alternating current half-waves which can readily be picked up by a train control or cab signaling apparatus and such a combination will now be briefly described.

*Cab signaling apparatus*

In the upper portion of Fig. 4, a cab signaling apparatus is shown as associated with the typical track section IT. This cab signaling apparatus includes two car-carried receivers $R^1$ and $R^2$ which are carried adjacent the track rails by the engine of a train and are connected through an amplifying apparatus to a master relay CMR. This master relay then responds to each of the driven code pulses received in advance of a train. More specifically, a train entering the track section IT, of course, shunts the track relay ITR and prevents the transmission of inverse code pulses, but the driven code continues to be transmitted over the track section towards the train as it proceeds toward the signal 2. Each of these driven code pulses is repeated by the car-carried master relay CMR, which in turn has front and back repeater relays CFP and CFBP. A car-carried home relay CHR is also provided, and it will be noted that this relay is picked up for any code rate employed for signaling purposes, such as 75, 120 and 180 impulses per minute. A transformer 220 is provided for repeating the impulses marked off by the car-carried master relay CMR into two resonated circuits which respectively control the car-carried relays CBH and CDR for the 120 and 180 code rates. With a 180 code rate being received over the track rails, a circuit is closed from (+) and including front contact 250 of relay CHR, back contact 251 of relay CBH, front contact 252 of relay CDR, through the indicator unit displaying G/G indication for proceed, to (—).

Whenever the 120 code rate is being received, the relay CDR is dropped away and the relay CBH is picked up. This closes a circuit for the indicator Y/Y from (+) through a circuit including front contact 250 of relay CHR, front contact 251 of relay CBH, back contact 253 of relay CDR, indicator Y/Y, to (—).

For a 75 code rate, both of the relays CBH and CDR are deenergized closing back contacts 251 and 252 so that energy through the front contact 250 of relay CHR supplies energy to the indicator Y/R.

It is obvious that if no code rate is being received, then the relay CHR is also deenergized and acts to apply energy to the indicator R/R through back contact 250. This, of course, indicates stop.

It is thus seen that cab signaling may be employed with the track circuits of the present invention without the necessity of adding apparatus for super-imposing alternating currents on direct current code track circuit apparatus as has been done heretofore. This arrangement also supplies the desirable track circuit characteristics for the coded wayside signaling apparatus controlled over the railroad track. It should be noted that any suitable type of cab signaling or train control may be employed, and that the diagrammatic illustrations of Fig. 4 are merely for the purpose of facilitating a ready understanding of the manner in which cab signaling may be used in combination with the trackway apparatus of the present invention.

Having described a code track circuit signaling system as one specific embodiment of the present invention, it is desired to be understood that this form is selected to facilitate in the disclosure of the invention rather than to limit the number of forms which it may assume; and, it is to be further understood that various modifications, alterations and adaptations may be applied to the specific forms shown to meet the requirements of practice without in any manner departing from the spirit or scope of the present invention except as limited by the appended claims.

What I claim is:

1. In an approach lighting system for a double track railroad having traffic in the same direction on both tracks comprising, two track sections one on each track and substantially co-extensive, signals at the entrance and exit ends of each section, coded track circuit apparatus associated with each track section for transmitting any selected one of a plurality of driven code pulses over the rails of that section from the exit end thereto in accordance with traffic conditions in advance, each of said code pulses comprising a number of half-cycles of alternating current, said coded track circuit apparatus for one of said sections only also transmitting an inverse code from the entrance end of said one section toward the exit end by applying momentary pulse across the rails between the impulses of any driven code, code responsive means for the entrance end of each section distinctively responsive to its driven codes to control the indications of its entering signal, said code responsive means for the entrance end of said one track section having no inverse code therein acting to also control the inverse code on the other track section, and means at the exit end of said one track section acting in response to said inverse code in that track section to control the lighting of the exit signals for both said track sections, whereby a train on either track causes the approach lighting of the signals for the exit ends of both said track sections.

2. In an approach lighting system for a double track railroad having traffic in the same direction on both tracks comprising two track sections one on each of said tracks and substantially co-extensive, light signals at the entrance and exit ends of each section, coded track circuit apparatus associated with each section for providing any selected one of a plurality of driven code pulses to the rails at the exit end of that section in accordance with traffic conditions and for one of said sections only also providing for the transmission of an inverse code by applying momentary pulses across the rails at the entrance end of the section between the impulses of any driven code, each of said driven code pulses comprising a plurality of half-waves of alternating current and each inverse code pulse comprising full wave rectified alternating current, code responsive means associated with the entrance end of each section and distinctively responsive to the rate of the driven code in that section to control the indications given by the signal at the corresponding entrance end, means associated with the signal locations at the exit ends of said sections and controlled by the inverse code in said one section for causing the light signals to be illuminated for both of said track sections when said inverse code is caused to cease, and means controlled by the code responsive means of said other track section for interrupting said inverse code in said one track section when a train occupies such other track section.

3. In a system of approach locking for power operated track switches, a plurality of approach track sections providing for the passage of traffic to and over said power operated track switch, each of said track sections being equipped with a coded track circuit having a driven code applied at its exit end in accordance with traffic conditions for the section in advance, and equipped with an inverse code transmitting means at its entrance end for transmitting momentary off-code pulses during each off-interval between the pulses of a driven code in accordance with the presence of an inverse code in the preceding section denoting the absence of a train in any preceding approach track section, approach code responsive means adjacent said track switch maintained energized only upon the continued reception of an inverse code, a manually governable home signal for governing traffic over said power operated track switch, an approach locking stick relay preventing power operation of said track switch, means effective to deenergize said approach locking stick relay when said home signal is controlled to indicate clear, a thermal relay, and pick-up circuit means including said thermal relay for energizing said approach locking stick relay if said approach code responsive means is deenergized for a predetermined time after said home signal is returned to stop.

4. In a system of approach locking for power operated track switches, a home signal and a plurality of distant approach signals governing train movement toward said switch, a section of track between each of said signals equipped with coded track circuit apparatus for transmitting driven codes from the exit end of each section toward its entrance end over the rails of that section to control the indication of the approach signal governing traffic into that section and also transmitting inverse code pulses toward the exit end of that section in accordance with whether a train is in that or any preceding approach track section, approach code responsive means maintained energized in response to the reception of an inverse code at said home signal, manually operable means for clearing said home signal dependent upon the setting up of a route over said switch, and means for changing the rates of the driven codes for said approach signals dependent upon the clearing indication of said home signal for causing said approach signals to give less restrictive indications, said means acting only providing said approach code responsive means is deenergized, whereby said home signal may be manually cleared at any time dependent upon the establishment of a proper route but said approach signals can be caused to give less restrictive indications only provided said approach code responsive means indicates the approach of a train within the limits of said approach track sections.

5. In a system of approach locking for power operated track switches, a home signal governing traffic over said track switch, a plurality of approach track sections each provided with an approach signal governing the entrance of traffic to its section, coded track circuit apparatus for each of said track sections for transmitting driven codes from the exit end of each section toward its entrance end over the rails of that section to control the indication of the approach signal governing traffic into that section, said apparatus also transmitting inverse code pulses toward the exit end of that section from the entrance end in accordance with whether or not a train is in that or any preceding one of said approach track sections, lock relay means effective when deenergized to prevent power operation of the track switch, manually operable means for controlling the clearing of said home signal dependent upon the establishment of a route over said track switch and the deenergized condition of said lock relay means, said manually operable means initially deenergizing said lock relay means, approach code responsive means maintained energized in response to the reception of an inverse code at said home signal and effective when deenergized to prevent energization of said lock relay, and means for controlling the rates of the driven codes for said approach signals in accordance with the clear indication of said home signal to thereby cause said approach signals to give less restrictive indications, said means acting only if said approach code responsive means is deenergized, whereby said home signal may be manually cleared only if a route is established over said track switch and the locking means for said track switch is deenergized, and whereby said approach signals may be caused to give less restrictive indications only provided said approach code responsive means indicates the approach of a train within the limits of said approach track sections.

6. In a coded track circuit signaling system for railroads, a stretch of track divided by insulated joints into a forward and a rear track section, a signal governing the entrance of traffic into said forward section at the location where said two sections join, a positive and a negative code following track relay connected across the rails of said forward section immediately in advance of said signal, code transmitting means for applying positive and negative code impulses across the rails of said rear section and immediately in the rear of said signal, said means being so connected that an impulse of positive polarity would operate said negative track relay or an impulse of negative polarity would operate said positive track relay if said joints were broken down, and decoding means controlled by said code following track relays for governing said signal in accordance with the codes received over said forward track section, said decoding means being organized to be unresponsive to the operation of said positive code following track relay if said negative code following track relay is in operation, whereby the erroneous operation of said positive code following track relay if said joints should be broken down during the reception of a legitimate negative code over said forward section would fail to act on said signal.

7. In a coded track circuit signaling system for railroads, a stretch of track divided by insulated joints into a forward and a rear track section, a signal governing the entrance of traffic into said forward section at the location where said two sections join, a positive and a negative code following track relay connected across the rails of said forward section immediately in advance of said signal, code transmitting means applying positive and negative code impulses across the rails of said rear section immediately in the rear of said signal, said means being so connected that an impulse of positive or negative polarity would operate said negative or positive track relay respectively if said joints were broken down, and means acting on said code transmitting means so as to normally allow the transmission of positive code impulses but to allow transmission of negative code impulses only if said negative code following track relay is receiving a code of negative impulses over said forward section, whereby said code transmitting means is interrupted if said joints are broken down and said negative code following track relay is operated due to an erroneous impulse from said code transmitting means.

8. In a coded track circuit signaling system for railroads, a stretch of track divided by insulated joints into a forward and a rear track section, a signal governing the entrance of traffic into said forward section at the point where said two sections join, a positive and a negative code following track relay connected across the rails of said forward section immediately in advance of said signal, code transmitting means applying positive and negative code impulses across the rails of said rear section immediately in the rear of said signal, said means being so connected that a positive code impulse would energize said negative track relay if said insulated joints between the two sections were broken down, decoding means for governing the indications of said signal and including relay means energized to permit said signal to give a more favorable indication than stop only if one or the other of said track relays is operated at a regular code rate intervals, and means preventing operation of said decoding means if said negative track relay is operated by erroneous impulses from said code transmitting means due to a break-down of said insulated joints.

9. In a system of approach locking for power operated track switches comprising, a home signal and a distant signal governing traffic movement toward said track switch, a section of track between said signals, driven code transmitting means associated with said home signal for applying driven code impulses to the rails of said track section with the code rates being selected in accordance with the clear or stop indications of said home signal, off-code transmitting means for impressing an off-code pulse across the track rails of said section at said distant signal during the off-interval between the impulses of any driven code irrespective of the rate of that code, an off-code track relay associated with said home signal, means for intermittently connecting said off-code track relay across the track rails at said home signal and of said track section during the off-intervals of the driven codes, decoding means associated with said distant signal and responsive to the different rates of said driven codes for controlling the indications of said distant signal, an approach locking stick relay acting when deenergized upon the clearing of said home signal to prevent operation of the track switch, code responsive approach relay means maintained energized so long as said off-code track relay continues to receive off-code pulses, a pick-up circuit for said approach locking stick relay closed only while said code responsive approach means is energized, whereby the entrance of a train into said section prevents the reception of off-code impulses by said approach code responsive means to thereby prevent energization of said approach locking stick relay through said pick-up circuit, and auxiliary pick-up circuit means for said approach locking stick relay including a thermal relay acting a predetermined time after said home signal is returned to stop if said approach code responsive means is deenergized.

10. In a system of approach control for a power operated track switch, a home signal governing traffic over the power operated track switch and at least two approach track sections leading to said switch, said track section nearest said switch having a distant signal governing the entrance of traffic thereto, coded track circuit apparatus associated with each of said track sections for providing a driven code applied to the rails at the exit end of the section and also providing for the transmission of an inverse code by applying momentary pulses across the rails at the entrance end of the section between the impulses of any driven code, said apparatus providing that the driven code of said near section has a rate in accordance with the stop or clear indication of said home signal, and providing that the driven code in said distant section has a rate in accordance with traffic conditions of said near section, and said apparatus also providing that the inverse code in said near section shall be dependent upon the presence of an inverse code in said distant section, approach locking means associated with said power operated track switch and controlled in accordance with the presence of an inverse code in said near track section, manually operable means for governing the indications of said home signal, manually controlled back-up signal for governing traffic in the opposite direction over said power operated track switch, and means effective when said back-up signal is cleared for removing all driven code from said near track section to thereby cause said distant signal to display a stop indication.

11. In a system of approach control for power operated track switches and highway crossings, a home signal governing traffic over the power operated track switch and at least two approach track sections leading to said switch, said track section nearest said track switch having a distant signal governing the entrance of traffic thereto and having a highway crossing adjacent its exit end, coded track circuit apparatus associated with each of said track sections for providing a driven code applied to the rails at the exit end of the section and also providing for the transmission of an inverse code by applying momentary pulses across the rails at the entrance end of the section between the impulses of any driven code, said apparatus providing that the driven code of said near section has a rate in accordance with the indication of said home signal and providing that the driven code in said distant section has a rate in accordance with traffic conditions in said near section, means associated with said distant signal and controlled by the presence and absence of an inverse code in said distant section for causing said inverse code pulses in said near section to normally be of one polarity, but to be changed to the opposite polarity when there is no inverse code in said distant section, approach locking means adjacent said power operated track switch controlled so as to release said track switch only upon the reception of an inverse code over said near track section, highway crossing signaling means associated with said highway crossing adjacent said home signal, and circuit means controlled by the presence of an inverse code of either polarity in said near section for maintaining said crossing signaling means inactive but effective upon the cessation of the inverse code in said near section upon the entrance of a train into that section for causing said crossing signaling means to become active, whereby the entrance of a train into said distant section acts upon said approach locking means associated with the power operated track switch without effecting the operation of said crossing signaling means.

12. In a system of approach control for highway crossings and approach lighting signals, a stretch of railway track having a leaving signal and an entering signal, said stretch also being divided into two track sections at the point of intersection of a highway crossing, another track section in approach to said entering signal, coded track circuit apparatus associated with each of said track sections for providing a driven code applied to the rails at the exit end of each section and also providing for the transmission of inverse code by applying momentary pulses across the rails at the entrance end of such section between the impulses of any driven code, said apparatus providing that the driven code applied to the exit end of said stretch shall have a rate in accordance with traffic conditions in advance, and that said driven code shall be repeated into the first track section of said stretch at the point of highway crossing intersection, said apparatus also providing that the driven code in said approach track section shall have a rate in accordance with traffic conditions for said stretch of track, means at said entering signal for causing the inverse code between that signal and the highway crossing to be dependent upon the presence of the inverse code at said approach track section, a track relay connected in multiple across the rails of said first section and the capability of remaining energized in response to the driven code pulses applied to said section by dropping away whenever a train enters that section, means causing the inverse code in said distant section beyond the highway crossing to be dependent upon the continued energization of said relay, highway crossing control means at said crossing responsive to the presence of an inverse code or a follow-up code in that section, means for applying a follow-up code at said entering signal, means at said exit signal responsive to the inverse code at said second section for approach lighting said exit signal when said inverse code ceases, whereby a train entering said approach track section causes said entering signal to be approach lighted and causes said crossing signal to be operated, but said exit signal is not illuminated until the train passes said entering signal, and whereby the passage of a train beyond said highway crossing causes a follow-up code to stop said crossing signaling means although the train is in said distant section, and whereby the leaving of the train beyond said exit signal allows said driven codes to be re-established and stop the transmission of said follow-up code.

13. In an approach locking system for power operated track switches, a plurality of approach track sections providing for train movement to and over said power operated track switch, each section provided with an approach signal at the entrance thereto, a manually controllable home signal at the exit of the last approach section for governing traffic over said track switch, driven code transmitting means associated with the exit end of each track section for applying driven codes to its track section having rates in accordance with the indication of the signal at the entrance to the next track section in advance, inverse code transmitting means associated with the entrance end of each of said approach track sections for applying a momentary inverse code pulse to the track rails at the entrance end of its section during each deenergized period between the successive impulses of any given code irrespective of the rate of such driven code, an approach track relay associated with the exit end of each approach track section and intermittently connected across the rails of its track section during the off-intervals of the driven codes, approach code responsive means controlled by each approach track relay for controlling the application of the inverse code pulses to the track section next in advance, said approach code responsive means at said home signal acting to prevent the clearing of said home signal until a train has entered said approach track sections, and means governing the rate of the driven code applied to said section at the home signal in accordance with the indication of said home signal, whereby the reliability of the inverse code to indicate the approach of a train is checked before the approach signals are permitted to give less restrictive indications.

14. In an approach locking system for power operated track switches, an approach track section providing for train movement to and over a power operated track switch, a manually controllable home signal at the exit end of said approach track section for governing traffic over said track switch, a distant signal for governing the entrance of traffic into said approach track section, coded track circuit apparatus associated with said approach track section for transmitting driven codes toward said rear home signal having rates in accordance with the clear or stop indication of said home signal and for transmitting inverse codes toward said home signal in accordance with the presence or absence of a train approaching said distant signal, inverse code receiving means at said home signal controlled in accordance with the presence or absence of an approaching train by said inverse codes transmitted over said approach section for preventing operation of said switch when a train is approaching, decoding apparatus associated with said distant signal for controlling that signal in accordance with the rates of said driven codes, and means associated with said home signal for causing said driven code in said approach section to be of a rate that causes said distant signal to give its most restrictive approach indication irrespective of the clear indication of said home signal unless said inverse code receiving means is controlled in accordance with the presence of a train in approach to said home signal.

15. In an approach locking system for railroads, a power operated track switch having a manually controlled home signal governing traffic thereover, an approach track section leading up to said home signal, a distant approach signal governing traffic into said approach track section, coded track circuit apparatus controlled in accordance with the presence or absence of a train approaching said distant approach signal for transmitting codes over said approach track section to said home signal, approach control means associated with said home signal and controlled by said codes to indicate the presence or absence of an approaching train, means for locking said power operated track switch whenever said home signal is cleared and releasing said track switch only a predetermined time after said home signal is returned to stop if said approach control means indicates the presence of an approaching train, and means for causing said distant approach signal to give a less restrictive approach indication when said home signal is cleared only provided said approach control means indicates the presence of an approaching train.

16. In a coded track circuit system for a stretch of track including a switch, a home signal governing train movement over said switch in its different positions, a distant signal in the rear of said home signal governing train movement over an approach track section toward said switch, manually governed means for operating said switch to different positions and for governing the clearing of said home signal, approach locking means for preventing operation of said switch, means governed over the track rails of said stretch and responsive to the presence of a train approaching said distant signal for deenergizing said approach locking means, coding means at the home signal normally transmitting a caution code over the track trails of said approach track section to govern said distant signal, and means effective only if said approach locking means is deenergized by an approaching train for rendering said coding means effective to transmit a clear code for said distant signal if said home signal is manually cleared.

17. In a coded track circuit system for a stretch of track including a switch, a home signal governing train movement over said switch in its different positions, a distant signal in the rear of said home signal governing train movement over an approach track section toward said switch, manually governed means for operating said switch to different positions and for governing the clearing of said home signal, approach locking means for preventing operation of said switch, code transmitting means at the home signal normally operating to transmit a caution code over the track rails of said approach track section to cause said distant signal to indicate caution, means at said distant signal normally transmitting inverse code pulses during the off intervals of said caution code for energizing said approach locking means, means responsive to the presence of a train approaching said distant signal for governing the transmission of said inverse code pulses to deenergize said approach locking means, and means effective only if said approach locking means is deenergized by an approaching train for rendering said code transmitting effective to transmit either a caution or a clear code in accordance with the controlled condition of said home signal.

18. In a coded track circuit system of the character described, the combination with a power operated track switch, a home signal governing traffic over said switch, a distant signal in the rear of said home signal governing train movement over an approach track section toward said switch, manually governed means for governing the power operation of said switch to its different positions and for governing the clearing of said home signal, locking means for preventing power operation of said switch, code responsive means at the home signal for governing the energization of said locking means, coding means for the opposite ends of said approach track section normally cooperating to transmit code pulses alternately in opposite directions for energizing said code responsive means and for causing said distant signal to indicate caution, means responsive to the presence of a train approaching said distant signal for governing the transmission of the code pulses toward said home signal to deenergize said code responsive means and render said locking means effective, and means effective only if said code responsive means is thus deenergized by an approaching train for rendering said coding means at the home signal effective to send either a clear or caution code to govern the indications of the distant signal in accordance with the indication of said home signal.

19. In a coded track circuit system for a stretch of track including a track switch, a home signal and a distant signal governing train movement toward and over said switch, manually controlled means for operating said switch and governing the clearing of said home signal, locking means for preventing operation of said switch including an approach control relay, coding means at the distant signal for sending code pulses toward the home signal for governing the energization of said approach control relay, means responsive to the presence of a train approaching said distant signal for governing said coding means to cause deenergization of said approach control relay, and code transmitting means at the home signal governed by said approach control relay and normally acting independently of the controlled condition of the home signal to transmit code pulses for a caution indication of said distant signal, said code transmitting means acting when said approach control relay is deenergized to transmit code pulses at either a clear or a caution code rate dependent upon the indication of said home signal.

20. In a coded track circuit signaling system for a stretch of track including a track switch, a home signal and a distant signal governing train movement toward and over the switch, manually governed means for controlling said home signal to clear and stop conditions, coding means at the home signal operable to transmit distinctive codes over the track rails toward said distant signal for governing its indications, and circuit controlling means operated in accordance with the position of said switch and the controlled condition of said home signal for determining the character of the code to be transmitted by said coding means, said circuit controlling means acting to select codes of different characters dependent upon the position of the switch if said home signal is cleared, and a code of a still different character independently of the position of the switch when said home signal is at stop.

21. In a coded track circuit signaling system for a stretch of track divided into blocks and including a switch, a signal at the entrance to each block including a home signal at the switch and a distant signal next in the rear thereof, manually governed means for operating said switch to normal and reverse positions and for governing the clearing of said home signal, code transmitting means associated with each signal for transmitting over the track rails of the block next in the rear of that signal one of a plurality of codes of different rates selected in accordance with the indications of that signal, and means for rendering said code transmitting means at the home signal effective to transmit a special distinctive code in accordance with the clear indication of said home signal when said switch is in the reverse position.

22. In a coded track circuit signaling system for a stretch of track divided into blocks and including a track switch, a signal at the entrance to each block including a home signal adjacent said switch and a distant signal next in the rear thereof, track circuit coding apparatus for controlling three different proceed indications of each signal by distinctive code rates in accordance with the extent of unoccupied track in advance of that signal, and means for changing the polarity of the code rate transmitted by said code transmitting means at said home signal toward said distant signal when said track switch is in the reverse position at the time said home signal is cleared.

23. In a coded track circuit signaling system for a stretch of track including a track switch, a home signal and a distant signal governing train movement toward and over said switch in one direction, a back-up signal for governing train movement over said switch in the opposite direction, manually controlled means for operating said switch to different positions and for governing the clearing of said home signal and said back-up signal, coding means for transmitting codes over the track rails of the stretch toward said distant signal for governing its indications in accordance with the indication of said home signal, and means effective when said back-up signal is cleared for rendering said coding means ineffective and thereby put said distant signal to stop.

24. In a coded track circuit signaling system for a stretch of track including a track switch, a home signal adjacent said switch for governing traffic thereover and normally indicating stop, means manually governed from a central office for at times causing said home signal to indicate clear, a distant signal in the rear of said home signal for governing traffic in approach to said home signal by giving any one of a plurality of different indications including two caution indications of differing restrictiveness, coding means at the home signal for transmitting distinctive codes over the track rails toward said distant signal for governing its indications, and means at said home signal for causing said coding means to transmit one distinctive code when said home signal is at stop to cause said distant signal to indicate its most restrictive caution indication, said means also causing said coding means to transmit another distinctive code when said home signal is cleared with said switch in a turn-out position to cause said distant signal to indicate its less restrictive caution indication.

25. In a coded track circuit signaling system for a stretch of track including a track switch, a home signal adjacent said switch for governing traffic thereover and normally indicating stop, manually controlled means for at times causing said home signal to indicate clear, a distant signal in the rear of said home signal for governing traffic in approach to said home signal by giving any one of a plurality of indications including a clear and two caution indications of differing restrictiveness, coding means at the home signal for transmitting different distinctive codes over the track rails toward said distant signal, code receiving means at the distant signal responsive to the different distinctive codes for governing its indications, and circuit means at said home signal for causing said coding means to transmit one distinctive code when said home signal is at stop whereby said distant signal displays its more restrictive caution indication, said circuit means causing said coding means to transmit another distinctive code when said home signal is clear and said switch is in its main line position, whereby said distant signal displays its clear indication, and said circuit means causing said coding means to transmit a further distinctive code when said home signal is clear with said switch in its turn-out position whereby said distant signal displays its less restrictive caution indication.

FRANK X. REES.